United States Patent [19]

Rao

[11] Patent Number: 4,559,600
[45] Date of Patent: Dec. 17, 1985

[54] MONITORING MACHINE TOOL CONDITIONS BY MEASURING A FORCE COMPONENT AND A VIBRATION COMPONENT AT A FUNDAMENTAL NATURAL FREQUENCY

[75] Inventor: Surendra B. Rao, Columbus, Ohio

[73] Assignee: Battelle Memorial Institute, Columbus, Ohio

[21] Appl. No.: 470,796

[22] Filed: Feb. 28, 1983

[51] Int. Cl.[4] .................. G06F 15/46; G08B 23/00
[52] U.S. Cl. ................................ 364/474; 364/508; 364/551; 340/680; 73/104; 408/8
[58] Field of Search ............... 364/474, 475, 507, 508, 364/550, 551, 566; 340/680, 679, 683; 73/104, 658, 659, 660, 661; 408/8, 9, 10, 11, 12, 13

[56] References Cited

U.S. PATENT DOCUMENTS

| | | | |
|---|---|---|---|
| 3,694,637 | 9/1972 | Edwin et al. | 364/551 X |
| 3,841,149 | 10/1974 | Edwin et al. | 364/551 X |
| 4,087,801 | 5/1978 | Noh | 73/104 X |
| 4,426,641 | 1/1984 | Kurihara et al. | 364/508 X |
| 4,435,770 | 3/1984 | Shiohata et al. | 364/508 |
| 4,437,163 | 3/1984 | Kurihara et al. | 364/508 |

Primary Examiner—Jerry Smith
Assistant Examiner—Allen MacDonald
Attorney, Agent, or Firm—Philip M. Dunson

[57] ABSTRACT

Methods and apparatus for monitoring, during machining of a workpiece (30,30'), the wear condition of a cutting tool (31,31') having its cutting portion in a structure (32,32') that is held by substantially more massive means (33,33').

A dynamometer (35,35') and filter (36) measure the component of the dynamic force exerted between the tool (31,31') and the workpiece (30,30') approximately in the direction (A,A') normal to the primary cutting edge (34,34') of the tool (31,31') and to the main cutting velocity (V,V') at approximately the fundamental natural frequency of the held structure (32,32') in the same normal direction (A,A'). An accelerometer (37,37'), filter (38), and integrators (39) measure the component of vibration in the tool (31,31') approximately in the same normal direction (A,A') at approximately the same frequency. Data processing equipment (41,42,43) computes the value of a wear indicative function of the ratio of the measured force component to the measured vibration component, and provides a display, adjustment, or other selected type of response (44) thereto.

The computed value of the function typically indicates the amount of wear (FW) on the flank of the primary and secondary cutting edges (34,34') of the tool (31,31') during turning, milling, or drilling.

23 Claims, 30 Drawing Figures

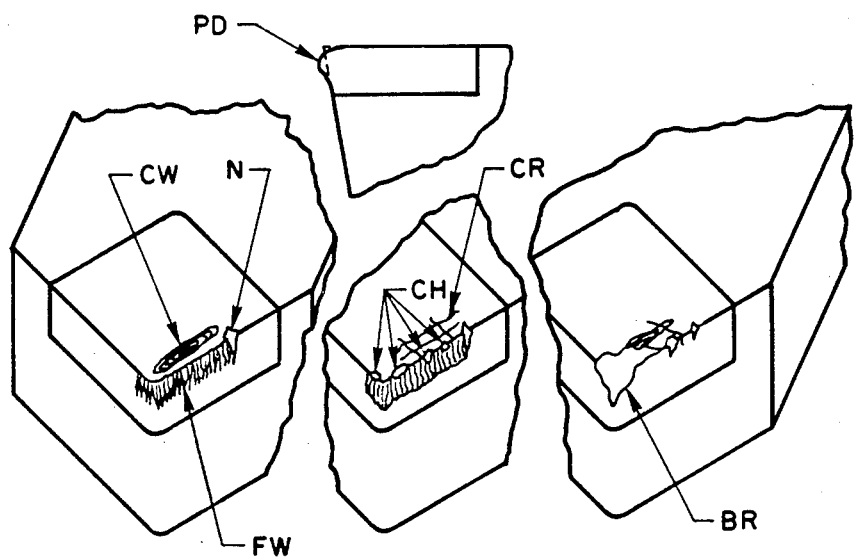
FIGURE 1. TYPES OF TOOL WEAR
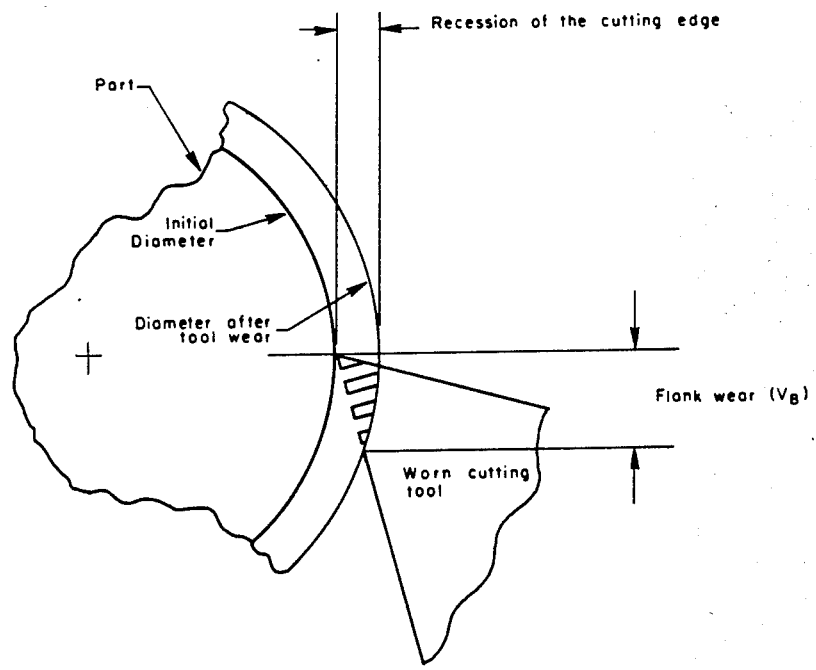
FIGURE 2. TOOL FLANK WEAR AND TOOL EDGE RECESSION

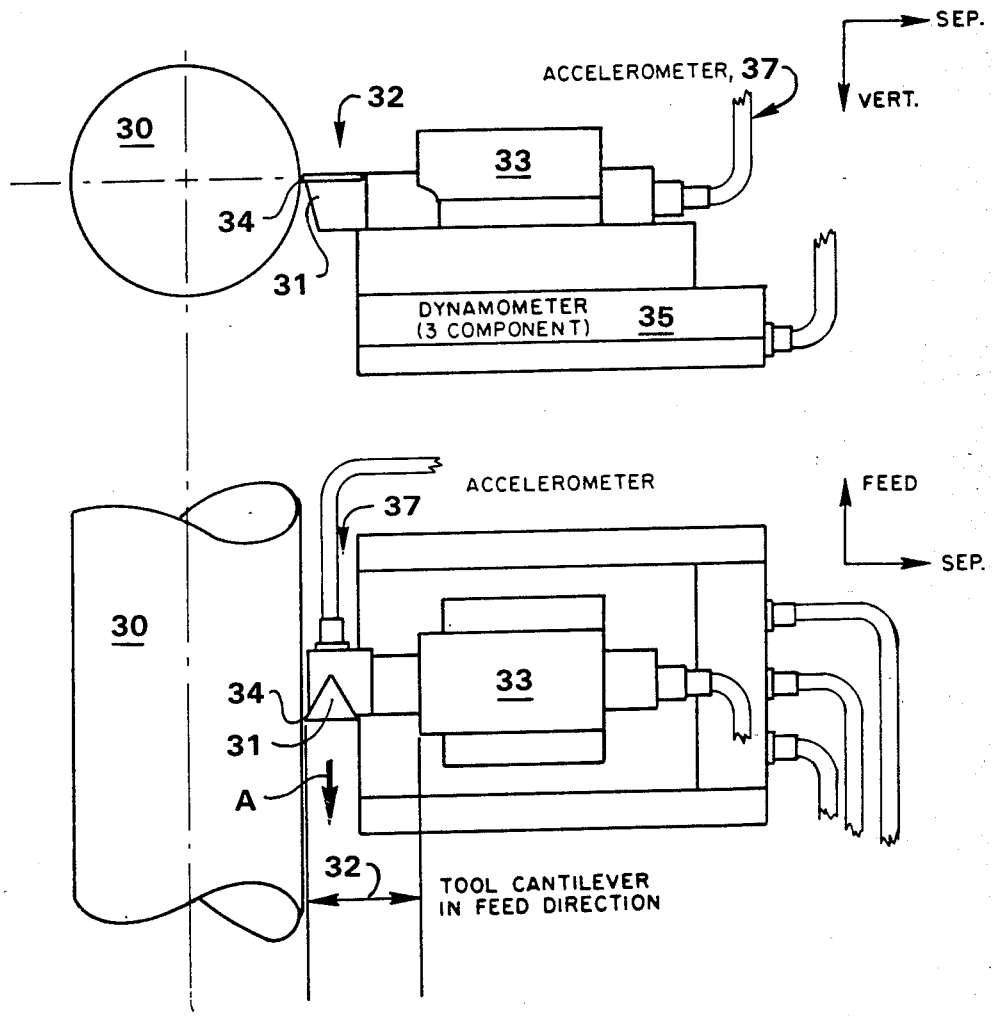
FIGURE 3a. EXPERIMENTAL SET-UP

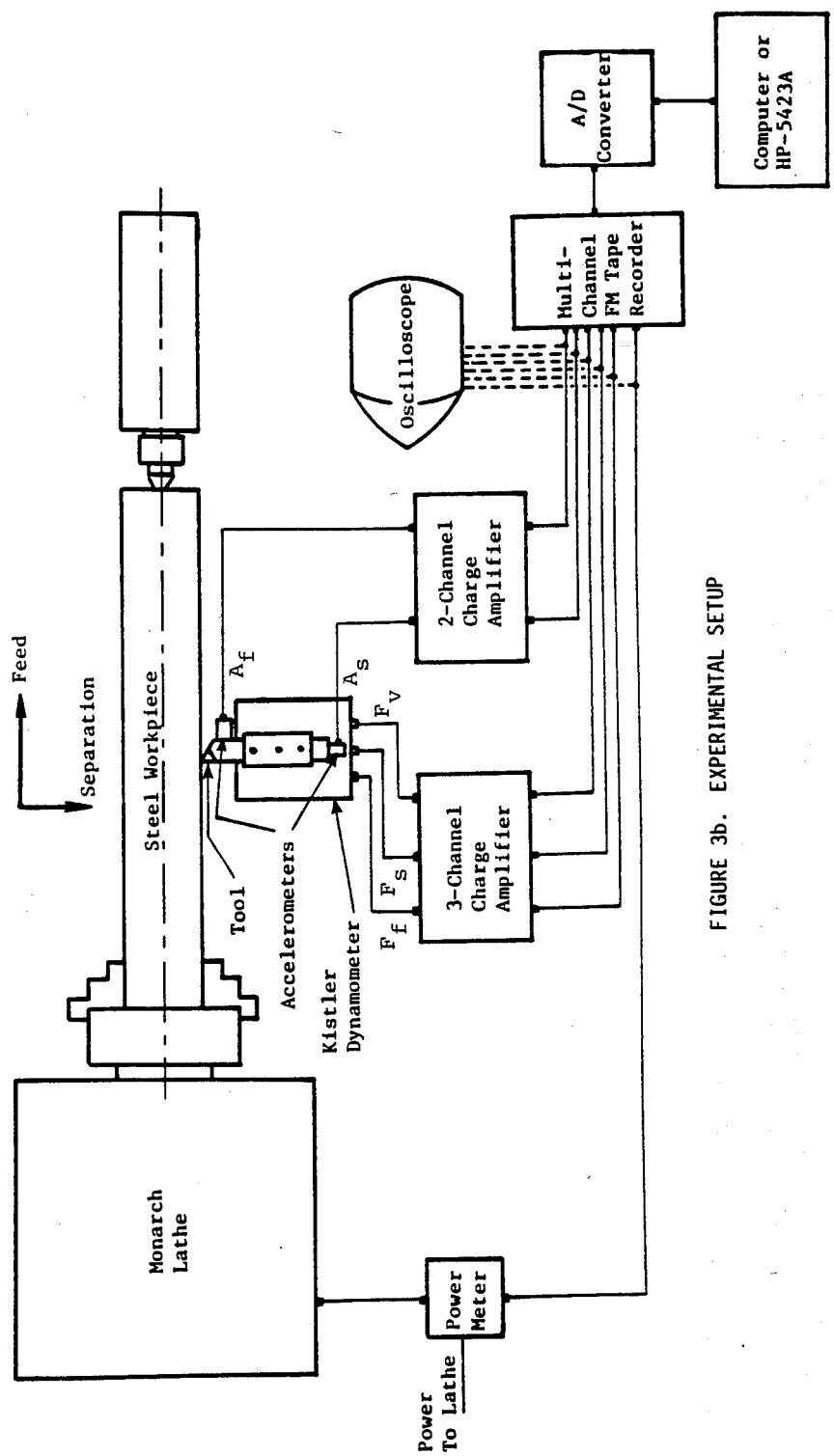
FIGURE 3b. EXPERIMENTAL SETUP

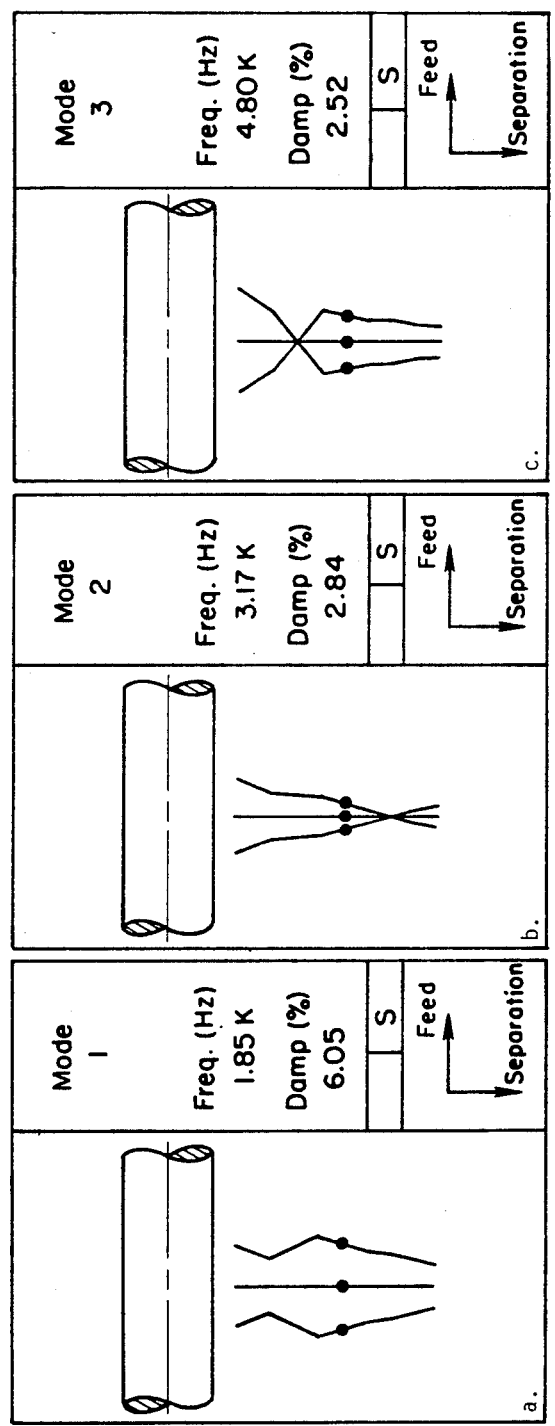
FIGURE 4. DYNAMIC MODES FROM FEED-FORCE EXCITATION
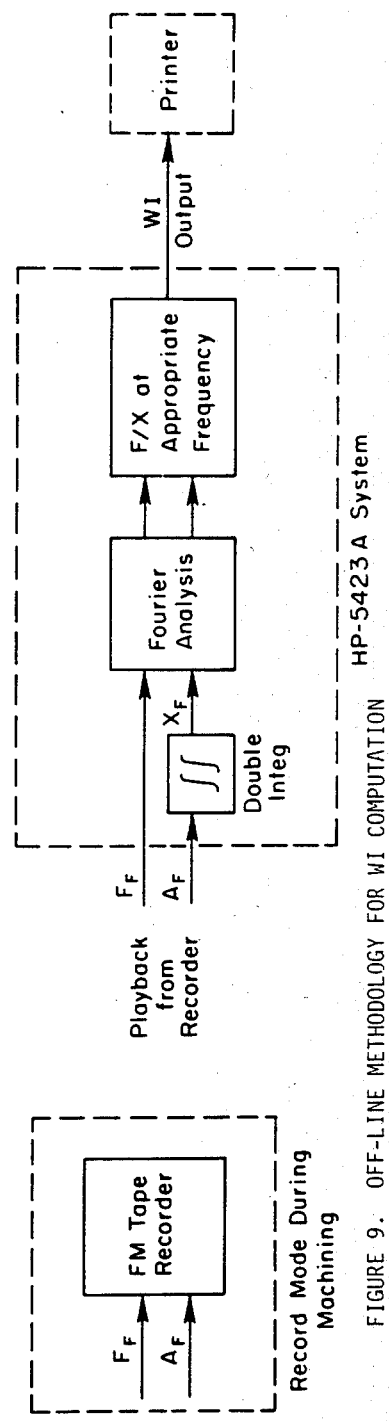
FIGURE 9. OFF-LINE METHODOLOGY FOR WI COMPUTATION

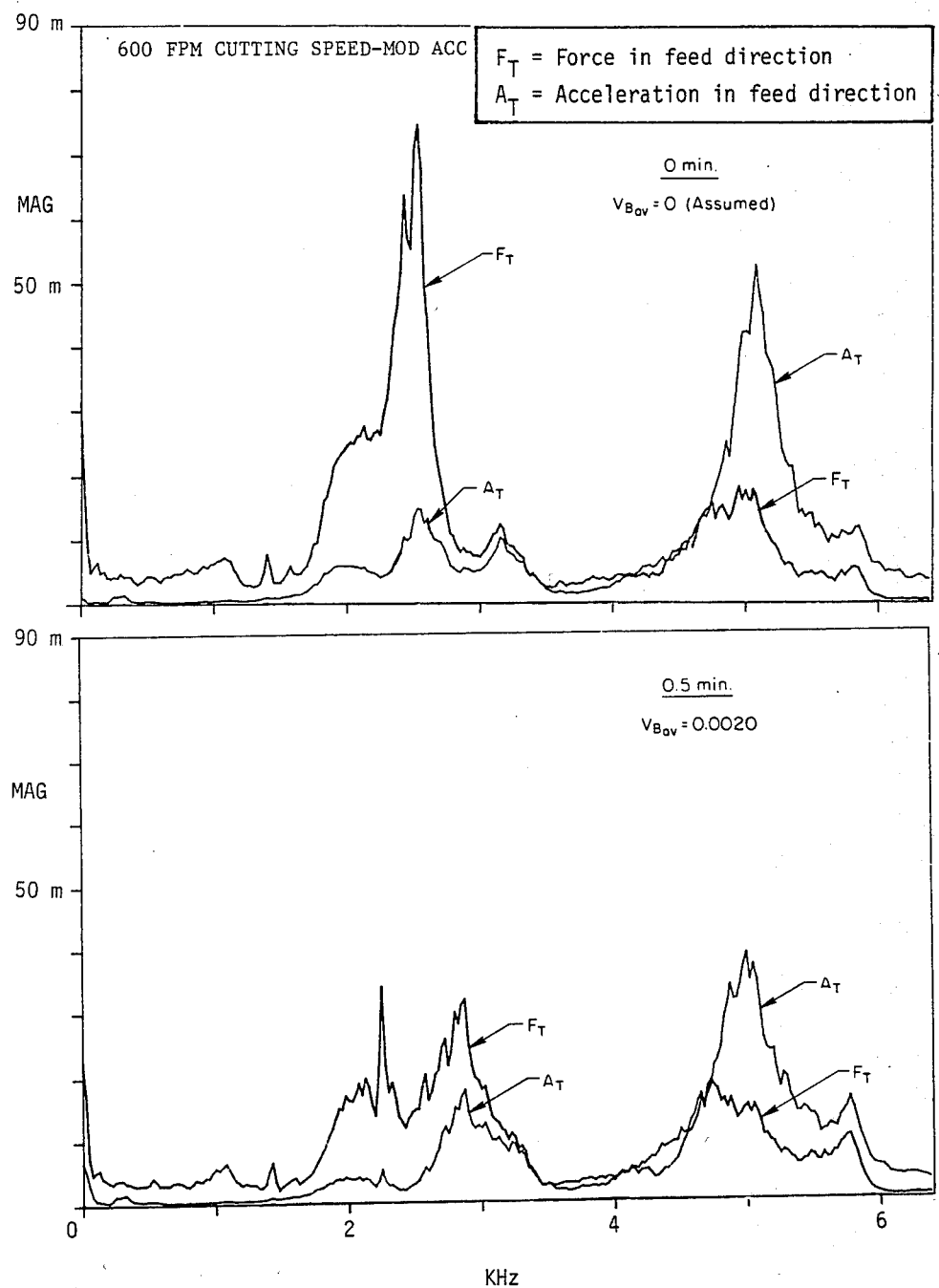
FIG. 5A   TYPICAL SPECTRA OF FORCE AND ACCELERATION IN THE FEED DIRECTION

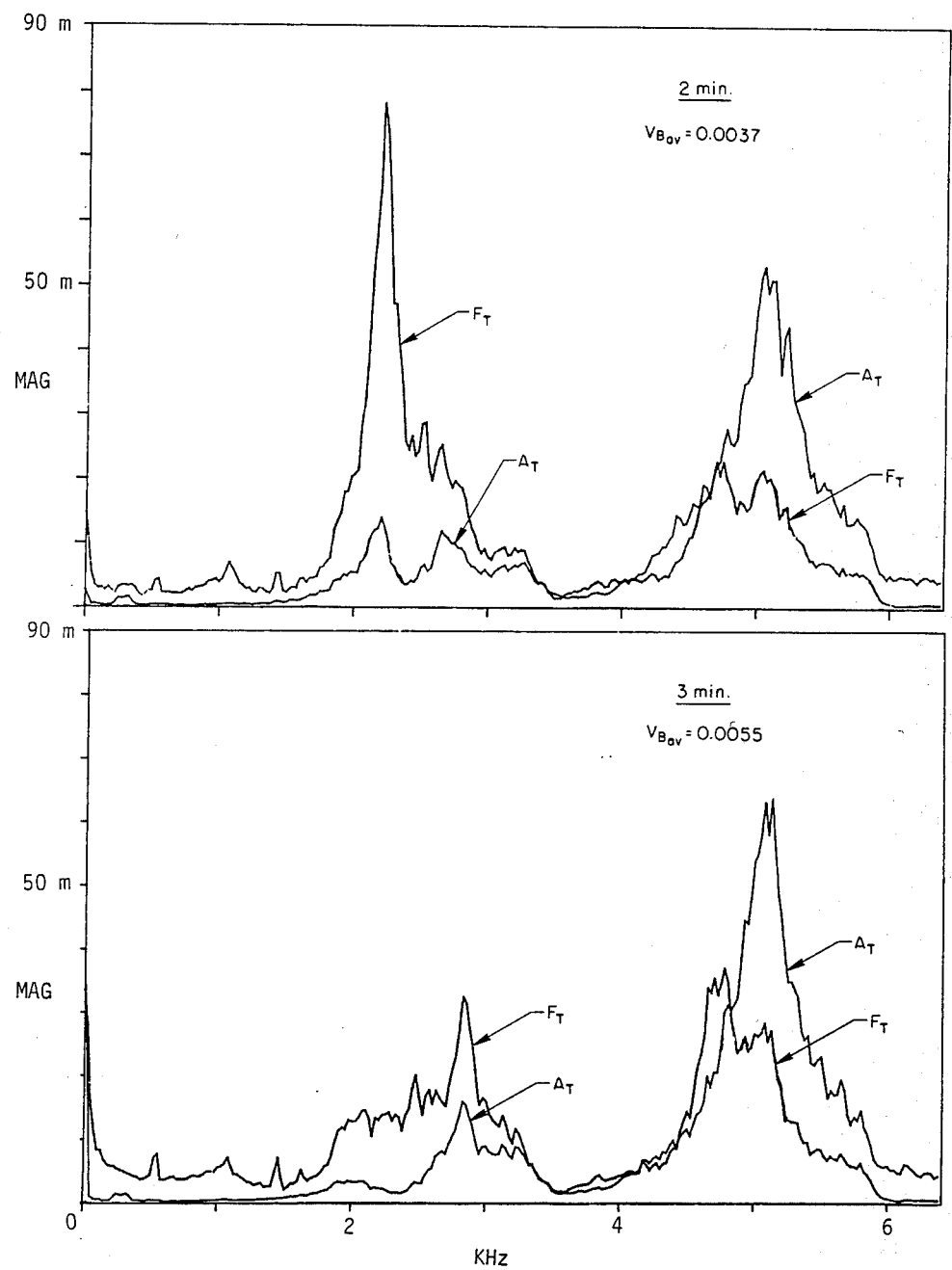
FIG. 5B TYPICAL SPECTRA OF FORCE AND ACCELERATION IN THE FEED DIRECTION

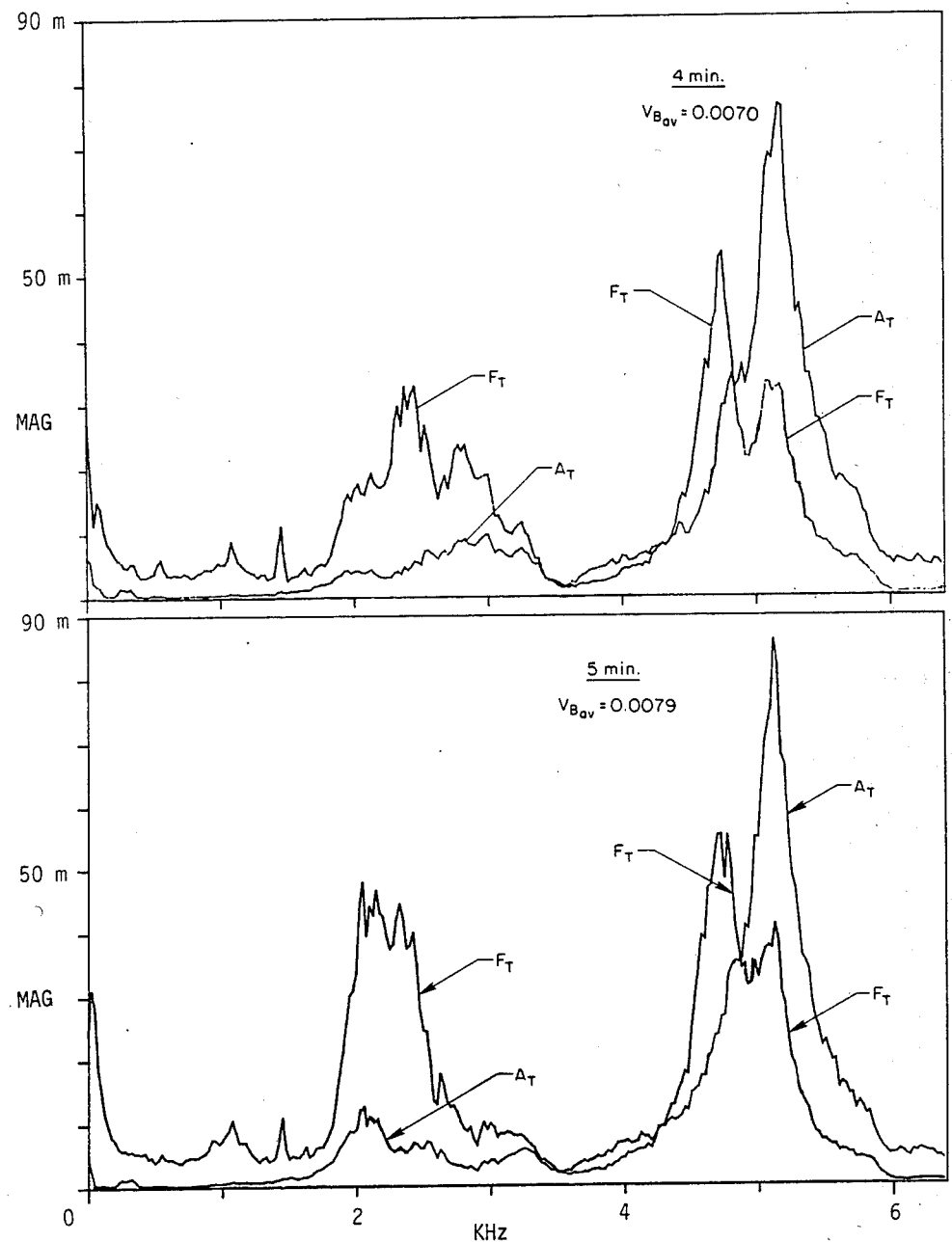
FIG. 5C  TYPICAL SPECTRA OF FORCE AND ACCELERATION IN THE FEED DIRECTION

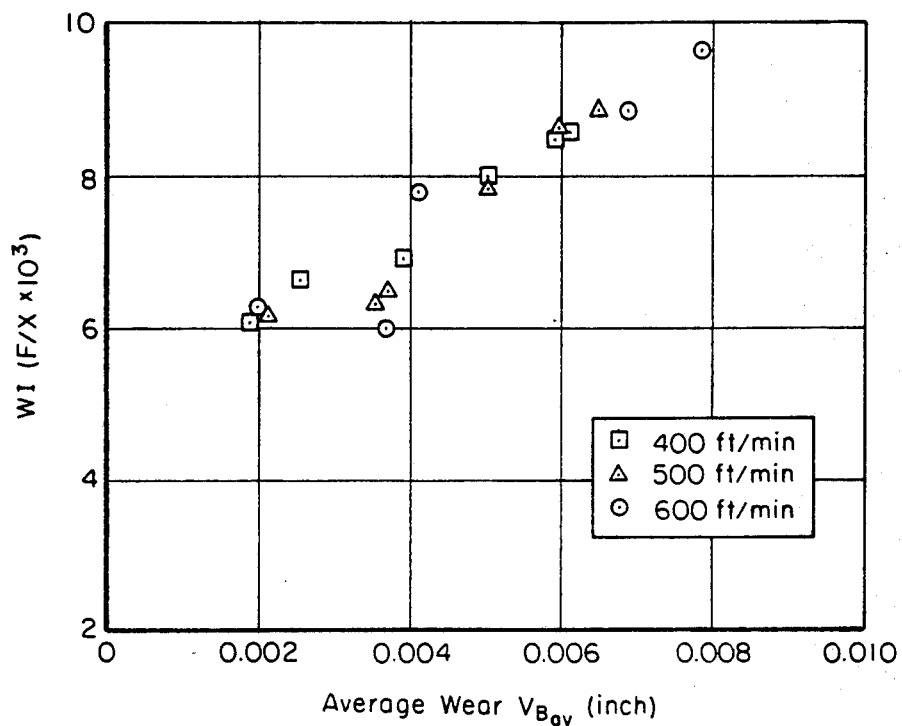
FIGURE 6. RELATION OF WEAR INDEX (WI) TO WEAR LAND AT THREE CUTTING SPEEDS
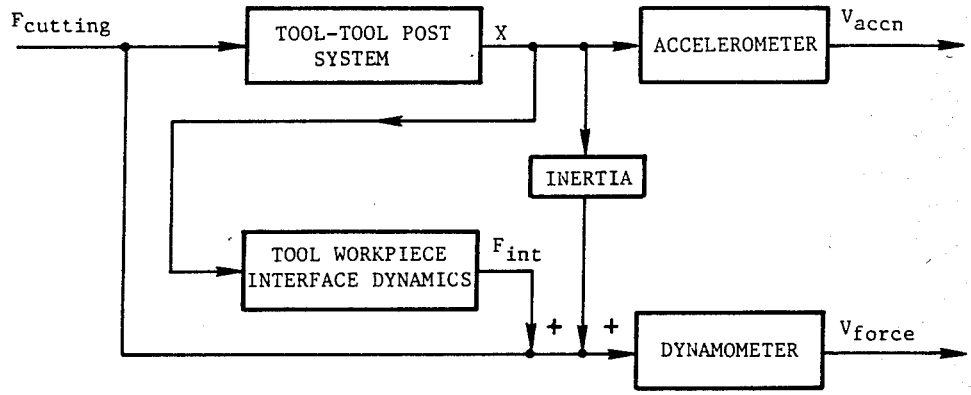
FIGURE 7. CUTTING PROCESS AND TOOL-TOOL POST-DYNAMOMETER INTERACTIONS DURING STABLE CUTTING

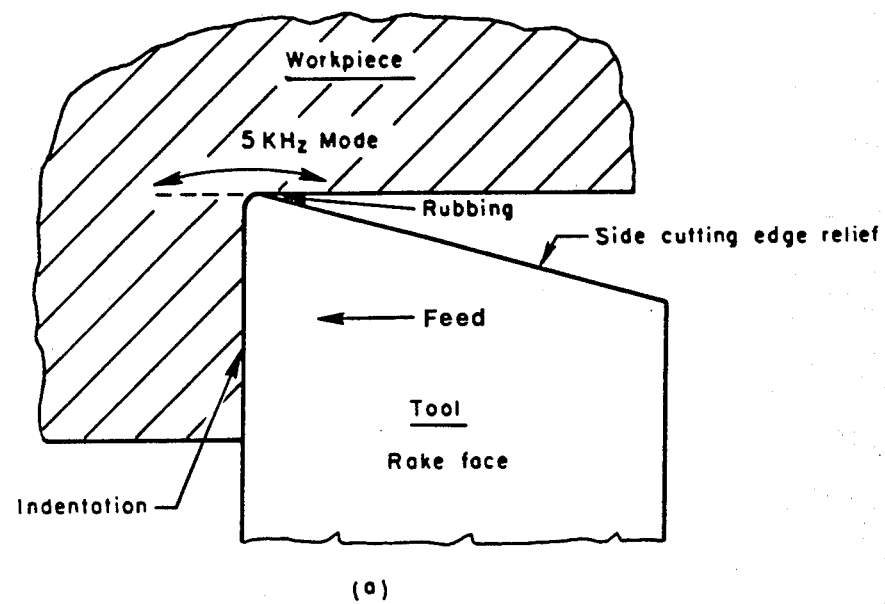
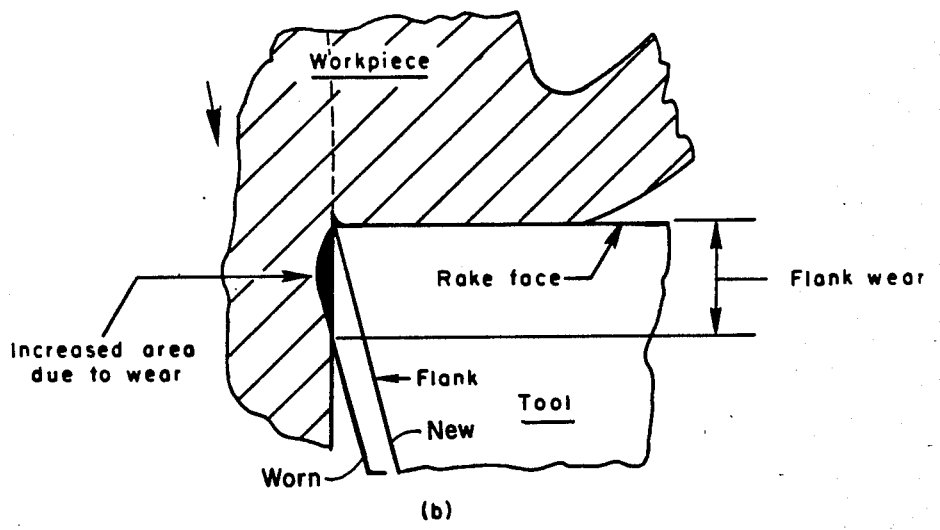
FIGURE 8. VARIATIONS IN THE TOOL TIP-WORKPIECE-INTERFACE AS THE TOOL WEARS

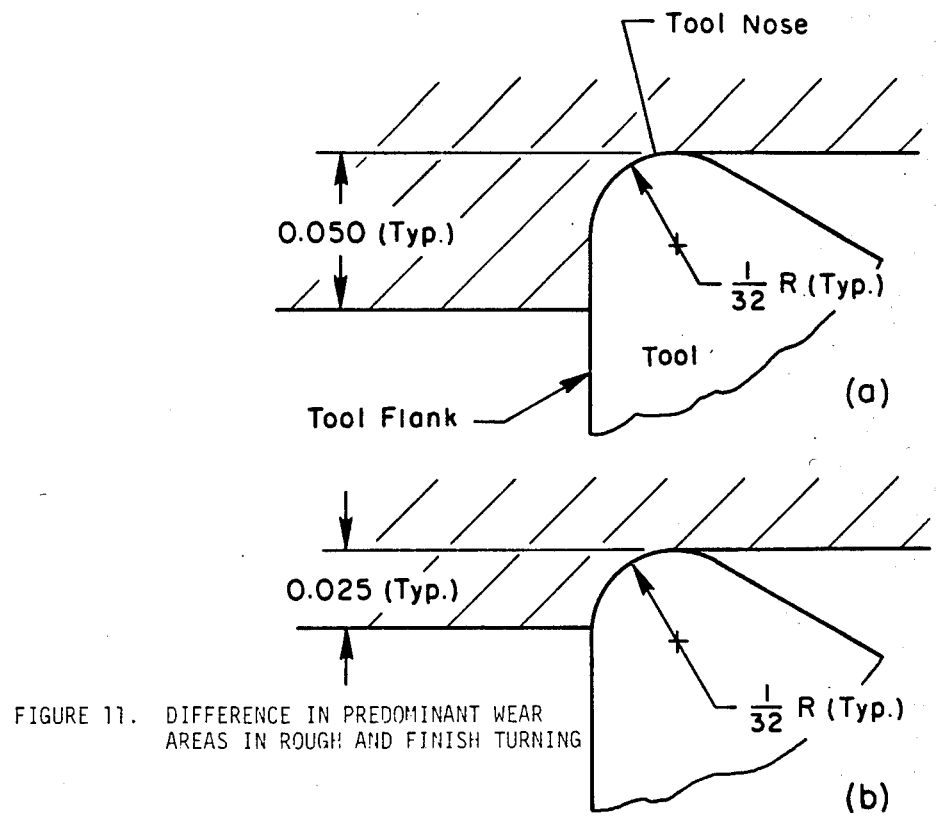
FIGURE 11. DIFFERENCE IN PREDOMINANT WEAR AREAS IN ROUGH AND FINISH TURNING
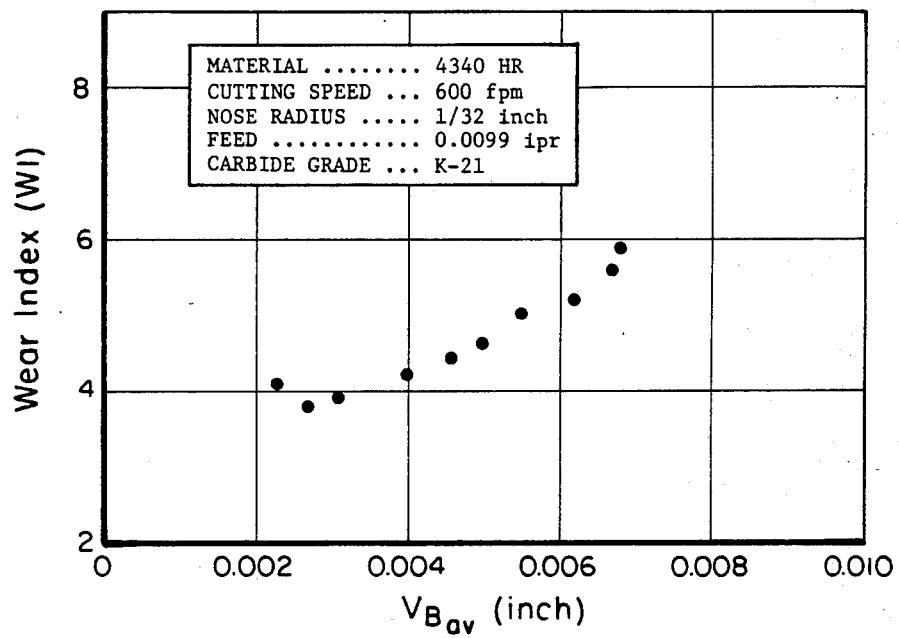
FIG. 26 WI TREND AS RECOGNIZED BY THE OFF-LINE TECHNIQUE

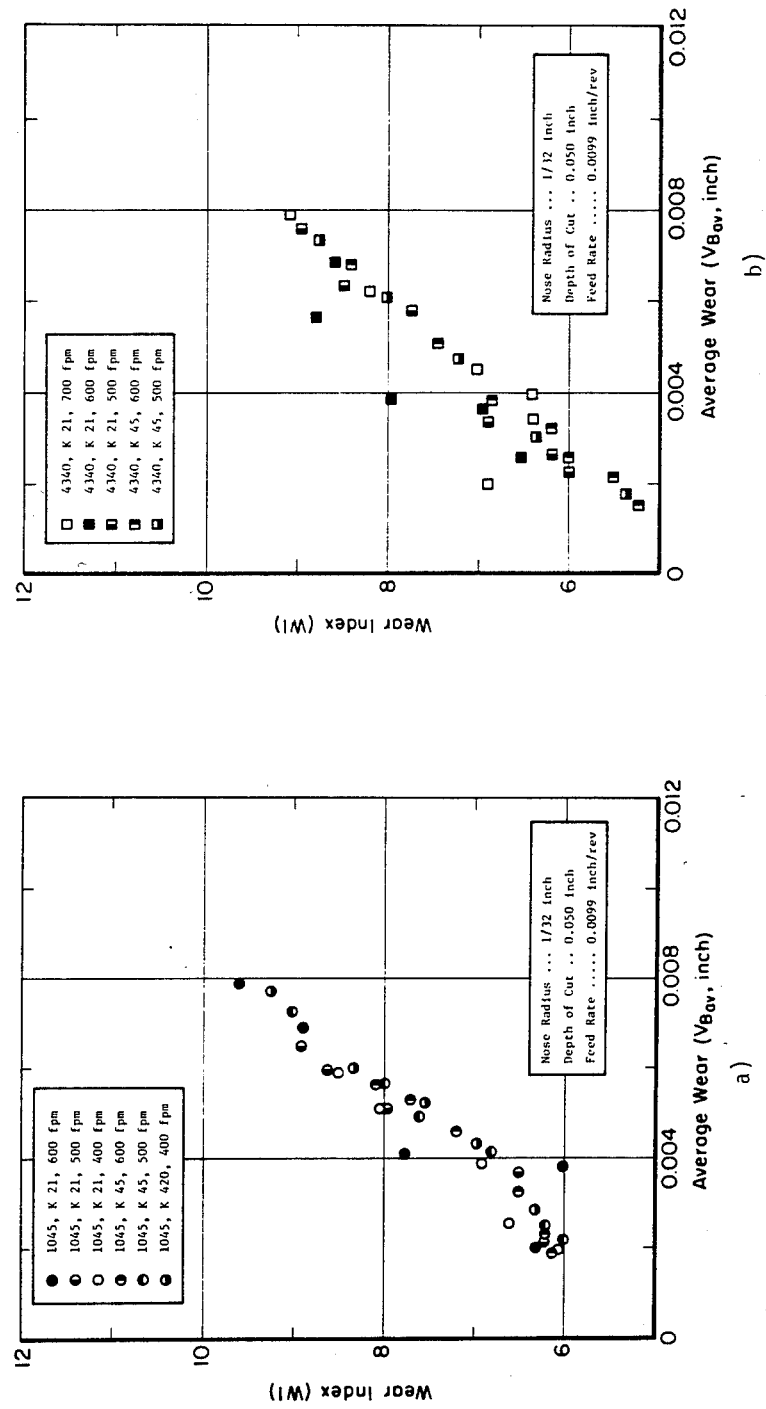
FIGURE 12. EFFECT OF TOOL-WORK MATERIAL COMBINATION ON WI

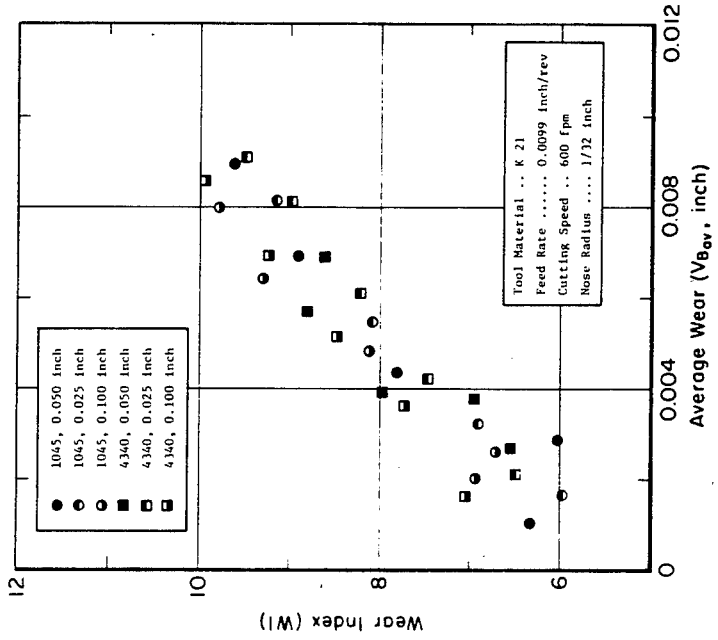
FIGURE 15. EFFECT OF DEPTH OF CUT - WORK MATERIAL COMBINATION ON WI
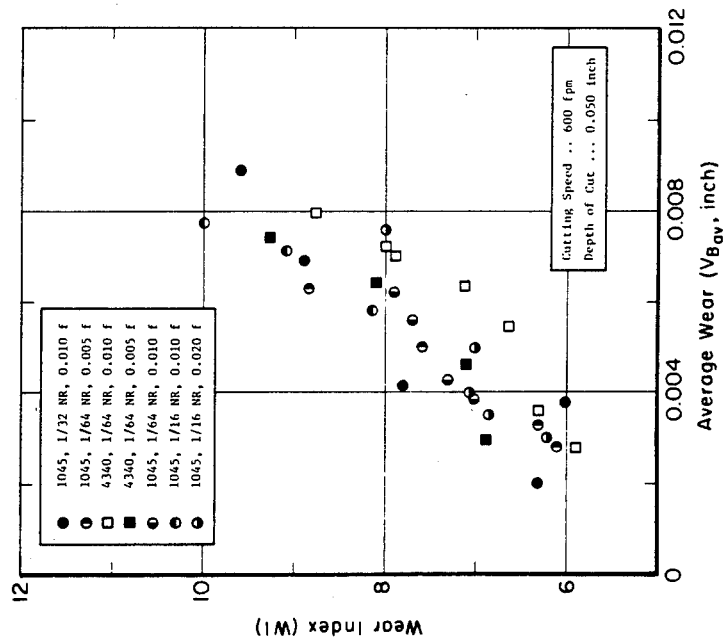
FIGURE 14. EFFECT OF NOSE RADIUS - FEEDRATE COMBINATION ON WI

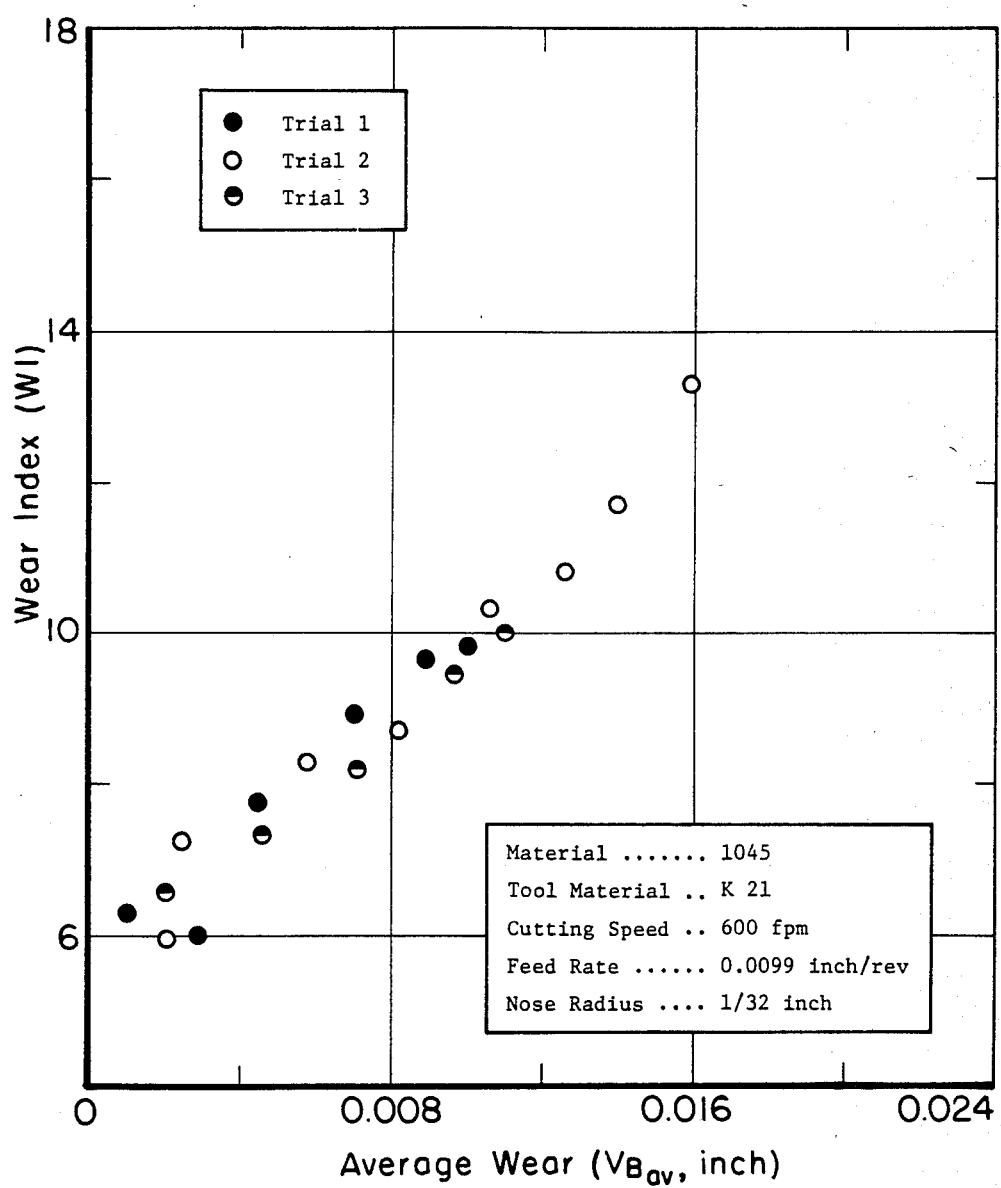
FIGURE 16. REPEATABILITY AND EFFECT OF LARGE WEAR ON WI

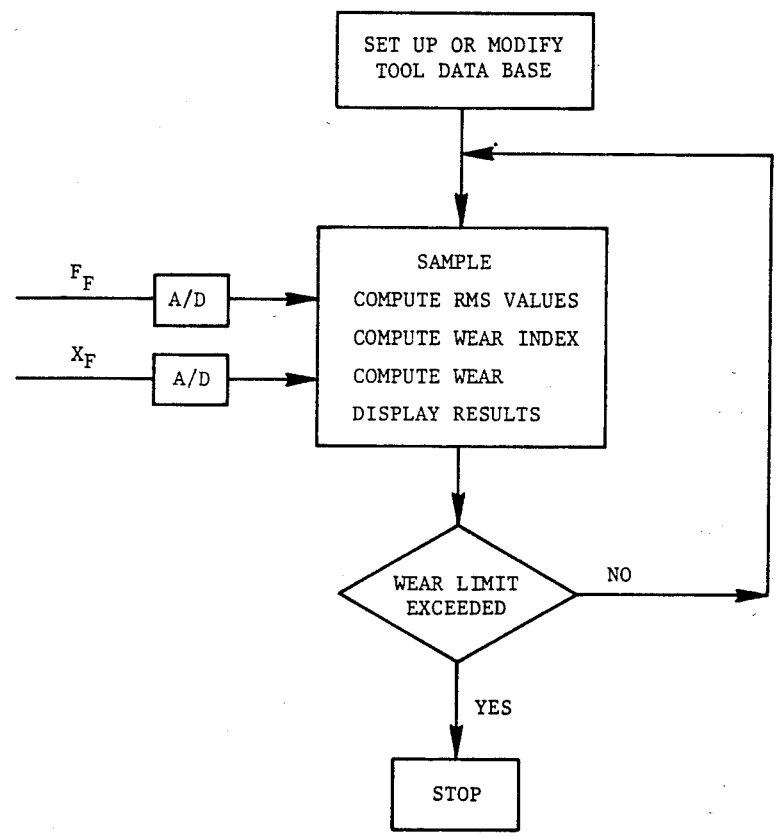
FIG. 18 BLOCK DIAGRAM REPRESENTATION OF THE RTTC MONITOR SOFTWARE

MONITORING MACHINE TOOL CONDITIONS BY MEASURING A FORCE COMPONENT AND A VIBRATION COMPONENT AT A FUNDAMENTAL NATURAL FREQUENCY

FIELD

This invention relates to methods and apparatus for monitoring the condition of cutting tools. It has to do more particularly with methods and apparatus for monitoring, during machining of a workpiece, the wear condition of a cutting tool having its cutting portion in a structure that is held by substantially more massive means.

Typical embodiments of the invention comprise the steps of, and means for, measuring the component of the dynamic force exerted between the tool and the workpiece approximately in the direction normal to the primary cutting edge of the tool and to the main cutting velocity at approximately the fundamental natural frequency of the held structure in the same normal direction, measuring the component of vibration in the tool approximately in the same normal direction at approximately the same frequency, computing the value of a wear indicative function of the ratio of the measured force component to the measured vibration component, and providing a selected type of response to the computed value of the function.

BACKGROUND

Any cutting tool engaged in machining, continuous or interrupted, is subjected to wear. The development of wear lowers machining efficiency, leads to poor surface quality and dimensional errors on the component being machined and, if left unattended, could result in catastrophic tool breakage with dangerous consequences.

There are several characteristic tool wear modes and these are schematically shown in FIG. 1 and described below:

Flank Wear (FW). This is the typical, regular type of abrasive wear occurring on the clearance surface of the cutting tool, primarily due to abrasion between the tool and the machined surface. It occurs on the flank of the primary cutting edge and the nose of the tool. (The former is referred to as flank wear and the latter as nose wear for the purpose of distinction, in this report).

Crater Wear (CW). Another regular type of wear occurring on the rake face of the cutting tool, usually due to inter-molecular diffusion between the tool and the chip.

Chipping, Cracks, or Breakage of the Edge (CH, CR, BR). This is an irregular type of tool wear and associated with brittle fracture of the cutting edge.

Plastic Deformation of the Tool Edge (PD). This is due to loss of compressive strength of the material at high temperatures generated during cutting and may contribute to both flank and crater wear.

Notching (N). This is the excessive flank wear that occurs at end of the depth of engagement between tool and workpiece and is caused by the rubbing of the work hardened top layer produced by the previous cut on the workpiece.

Of these various modes, proper choice of tool material-workpiece material combination can eliminate all but flank wear on the nose and the primary cutting edge of the tool. Moreover flank wear of the nose and the cutting edge and catastrophic breakage, due to a variety of reasons, are the only modes of wear that impact the quality of the workpiece and the efficiency of the machining process. Consequently only these modes of tool wear are significant and to be considered in the Real-Time Tool-Condition (RTTC) Monitoring.

The process of tool wear is a complex phenomenon since it is affected by tool material properties, work material characteristics, cutting process variables and possibly machine tool parameters (stiffness, etc.). The complexity of this phenomenon does not lend itself to off-line prediction of tool wear and tool life. Consequently, in manufacturing, it is necessary to adopt a very conservative approach to tool replacement, resulting in frequent and possibly unnecessary tool changes in order to maintain product quality. Further, due to the unpredictable nature of tool wear, off-line or on-line dimensional inspection is necessary to assure workpiece accuracy with consequent additions to product costs.

In order to address these drawbacks and in order to realize the unmanned machining systems of the future it becomes imperative to develop a Real-Time Tool-Condition (RTTC) monitor, with the following capabilities.

1. Evaluate overall tool condition during rough machining (flank wear of cutting edge and nose wear).
2. Evaluate wear processes that affect workpiece dimensional accuracy during finish machining (nose wear, see FIG. 2).

With the first capability, it will be possible to determine when the tool edge needs to be replaced. Also, the knowledge of the overall tool condition, in real time, constitutes the last link to the exciting possibility of real time optimization of the machining process. The second capability will enable tool position feedback to improve dimensional accuracy control of the machined component.

The RTTC monitor of the present invention is designed to be capable of these functions in a single point-turning operation.

A review of existing literature indicates that no accurate, commercially viable system for direct monitoring of tool conditions exists. Primitive systems that monitor power or force levels or measure workpiece dimensions are available. These systems have limited use or limited capabilities and do not constitute a satisfactory solution to the problem.

The effort to develop an RTTC monitor with these capabilities was planned to be accomplished in two phases.

First Objective: To evaluate sensors and analyses of sensor outputs to establish the accuracy precision and applicability of different cutting tool monitoring techniques for controlling production metal cutting processes.

Second Objective: To develop and demonstrate an RTTC monitor based on the best procedure established in the first year's research.

The first effort resulted in the identification of a Wear Index (WI) uniquely correlated to tool wear. The second established the validity of the WI and demonstrated the feasibility, applicability and accuracy of an RTTC monitor based on this WI.

DISCLOSURE

Typical methods and apparatus according to the present invention for monitoring, during machining of a workpiece, the wear condition of a cutting tool having its cutting portion in a structure that is held by substantially more massive means comprise the steps of, and means for, measuring the component of the dynamic force exerted between the tool and the workpiece approximately in the direction normal to the primary cutting edge of the tool and to the main cutting velocity at approximately the fundamental natural frequency of the held structure in the same normal direction, measuring the component of vibration in the tool approximately in the same normal direction of approximately the same frequency, computing the value of a wear indicative function of the ratio of the measured force component to the measured vibration component, and providing a selected type of response to the computed value of the function.

Typically the held structure comprises a cantilever structure that extends from the substantially more massive holding means, and the cutting portion of the tool is at the outer end of the cantilever. Where the machining comprises turning, as on a lathe, the normal component measuring direction is the direction in which the tool is fed along the workpiece; and where the machining comprises milling or drilling with a rotating tool, the normal component measuring direction is perpendicular to the axis of rotation and to the main cutting edges of the tool. Typically the ratio comprises the root mean square value of the force component divided by the root mean square value of the vibration component during a predetermined time, and the computing comprises computing the amount of wear on the flank of the primary and secondary cutting edges of the tool.

The response typically comprises providing a visual display indicative of the computed amount of wear, automatically adjusting the cutting conditions to control the rate of wear, automatically adjusting the position of the tool relative to the workpiece to compensate for the recession of the cutting edges of the tool, automatically replacing the tool when the wear on the flank exceeds a selected limit, or a combination of such responses.

A typical system according to the present invention provides real-time monitoring of the amount of flank wear land on the primary and secondary cutting edge of a cutting tool engaged in a metal cutting operation. In turning, as on a lathe, this is accomplished by measurement of the dynamic force component and the vibration of the tool holder in the feed direction, computation of a wear index (WI), and computation of the flank wear from the computed WI. This is carried out in real time with the aid of a portable microcomputer system, positioned next to the machine tool, and electrically connected to a force tranducer and vibration transducer which measure the necessary parameters for the computation of the WI, with the necessary signal conditioning equipment in between. The WI is computed by dividing the root mean square (RMS) value of the dynamic force amplitude by the RMS value of the vibration amplitude at the first natural frequency of the cantilevered part of the tool holder. The other frequencies that may be present in the force and vibration signals are eliminated by electronic band-pass filtering so that the microcomputer system processes only the relevant frequency. The actual flank wear land is then accurately computed by the microcomputer system using a simple regression formula whose parameters are previously obtained during the calibration of the system.

This invention provides accurate monitoring of the amount of flank wear land, in real time, of a cutting tool engaged in a machining operation. The flank wear land of a tool is illustrated at FW in FIG. 1. Execessive flank wear can lead to inefficient machining, poor surface finish on the machined component, poor dimensional control, and (if left unattended) to tool breakage with catastrophic consequences. Knowledge of the amount of wear of the cutting tool can be utilized to implement decisions of tool replacement when a wear limit is exceeded, change of cutting conditions to reduce wear rate (increase tool life), and change of relative positions of the tool and the workpiece to compensate for the recession of the cutting edge to improve dimensional accuracy of the machined component. Since machining can be conducted under a wide variety of conditions (cutting speed, feed rate, depth of cut, tool geometry and materials) a monitoring system should have the capability of accurately monitoring tool flank wear independent of, if not all, at least a majority of these variables in order to be universally applicable and practical.

The present invention provides such a system for accurately monitoring the amount of tool flank wear, in real time, independent of the cutting process parameters such as cutting speed, depth of cut, and feed rate. A typical system comprises a force transducer and a vibration transducer to monitor the dynamic force amplitude in the appropriate direction and the vibration amplitude of the cantilevered portion of the tool holder in the same direction. The electrical outputs of these transducers are then band-pass filtered to eliminate all signal components other than components at or close to the first natural frequency of the cantilevered portion of the tool holder, in the proper direction. These filtered signals are then fed as input into the analog to digital (A to D) converters of a microcomputer system.

The microcomputer system is programmed to sample the force and vibration amplitudes at the specified sampling frequency, for a specified length of time and to compute the RMS value of the two signals. It then computes the WI, which is the RMS value of the force divided by the RMS value of the vibration. It has been shown, as a part of the present invention, that this computed WI is an accurate measure of the flank wear land on the cutting tool, and is independent of cutting conditions such as cutting speed, feed rate, depth of cut, and tool geometry. So the wear index can be used to compute the actual flank wear land using a simple regression equation the values of whose parameters are obtained during the calibration of the system. The computed wear, from the WI, typically is displayed on a screen and can be used for other purposes such as warning an operator or shutting off the machine when a maximum value is exceeded, or adjusting the feed servo-mechanism to compensate for the loss of the cutting edge.

FIG. 1 shows flank wear, at FW, on the primary cutting edge and secondary cutting edge of a tool mounted in a tool holder. This is the specific type of wear that the present system is designed to monitor. FIG. 3a shows the mounting of the necessary force and vibration transducers that constitute the system. The tool tool-holder system is mounted on a force dynamometer to obtain the dynamic force amplitudes in the feed direction. An accelerometer, which is a vibration transducer, is mounted on the tool holder, the entire set up being mounted in the proper position on the machine tool, which is a lathe in this instance.

FIG. 17 shows the rest of the system in a schematic fashion. It consists of the dynamic feed force ($F_{feed}$) and the vibration (A$_{feed}$) signals being input into band pass filters whose cut-off frequencies are set to such values that all signal amplitudes that are not at or close to the natural frequency of the cantilevered portion of the tool holder in the feed direction (which frequency is predetermined) will be eliminated. The filtered acceleration signal is double integrated to convert it to dynamic displacement of the tool holder in the feed direction, is DC offset to eliminate any DC component that may be generated in the standard double integration circuitry, and is input to one A to D channel of the microcomputer system. The filtered dynamic feed force signal is directly input into another A to D channel of the microcomputer system. The standard microcomputer system samples the two A to D channels, computes the WI, computes the flank wear land, and displays it on a monitor.

FIG. 18 describes the system software, which was written in PASCAL computer language. It has the capability to set up and retain in the computer memory details of the actual tool and tool holder being monitored, indexed by ID#. These details are the geometry of the tool, the first natural frequency of the cantilevered portion of the tool holder in the feed direction, associated sampling frequency and time of sampling of the data, and allowable wear limit on the tool. Once the system tool data base is set up and prompted to monitor (as machining is started) the software will sample the data, compute the RMS values of force (F) and vibration (X), compute the WI (ratio of F/X), compute the flank wear land (V$_B$), and display the computed results. The flank wear land is computed as $$V_b = K_1 + K_2(WI)$$

where $K_1$ and $K_2$ are regression parameters that have been obtained by calibrating the system. The system will then compare the computed value with the allowable wear limit and instruct the operator if the wear limit has been exceeded.

FIG. 8 illustrates the concept of the WI on which this system is based. As the tool machines and the tool holder vibrates at its natural frequency, in the feed direction, the tool rubs at its nose (secondary cutting edge) and indents on the primary cutting edge against the workpiece material (FIG. 8a). When the tool edge is sharp (no wear land) the area of contact between the tool and the workpiece is small. Consequently the resistance to vibration is small (F/X is small, ie WI is small). As a wear land progressively develops, the area of contact at the primary and secondary cutting edges between the tool and the workpiece increases (FIG. 8b). Consequently the tool holder meets with increased resistance to its vibration (F/X increases, ie WI increases). This WI has been proved, by experiments, to be dependent on the wear land and independent of all other cutting process variables.

DRAWINGS

FIG. 1 is a schematic representation, in perspective and side views, illustrating types of tool wear.

FIG. 2 is a schematic view illustrating tool flank wear and tool edge recession.

FIG. 3a is a schematic representation, in side and top views, of part of an experimental setup used in connection with the present invention.

FIG. 3b is a schematic view of the overall experimental setup as in FIG. 3a.

FIG. 4 is a schematic representation of dynamic modes of the tool-holder system (structure holding the cutting tool) from feedforce excitation.

FIGS. 5A–5C is a group of graphs showing typical spectra of force and acceleration in the feed direction.

FIG. 6 is a graph showing the relation of wear index (WI) to wear land at three cutting speeds.

FIG. 7 is a block diagram of cutting process and tool-tool post-dynamometer interactions during stable cutting.

FIG. 8 is a schematic representation, in top and side views, illustrating variations in the tool tip-workpiece-interface as the tool wears.

FIG. 9 is a block diagram illustrating off-line methodology for computation of the wear index (WI).

FIG. 11 is a schematic representation, in top views, illustrating the difference in predominant wear areas in rough and finish turning.

FIG. 12 is a group of graphs showing the effect of tool-work material combination on wear index (WI).

FIG. 14 is a group of graphs showing the effect of nose radius-feedrate combination on wear index (WI).

FIG. 15 is a group of graphs showing the effect of depth of cut-work material combination on wear index (WI).

FIG. 16 is a group of graphs showing the repeatability and effect of large wear on wear index (WI).

FIG. 18 is a flow diagram representation of the real-time tool condition (RTTC) monitor software.

FIG. 19b is a software flowchart for the rest of the system of FIG. 19a.

FIG. 26 is a graph of wear index (WI) trend as recognized by the off-line technique.

CARRYING OUT THE INVENTION

Figure 10:
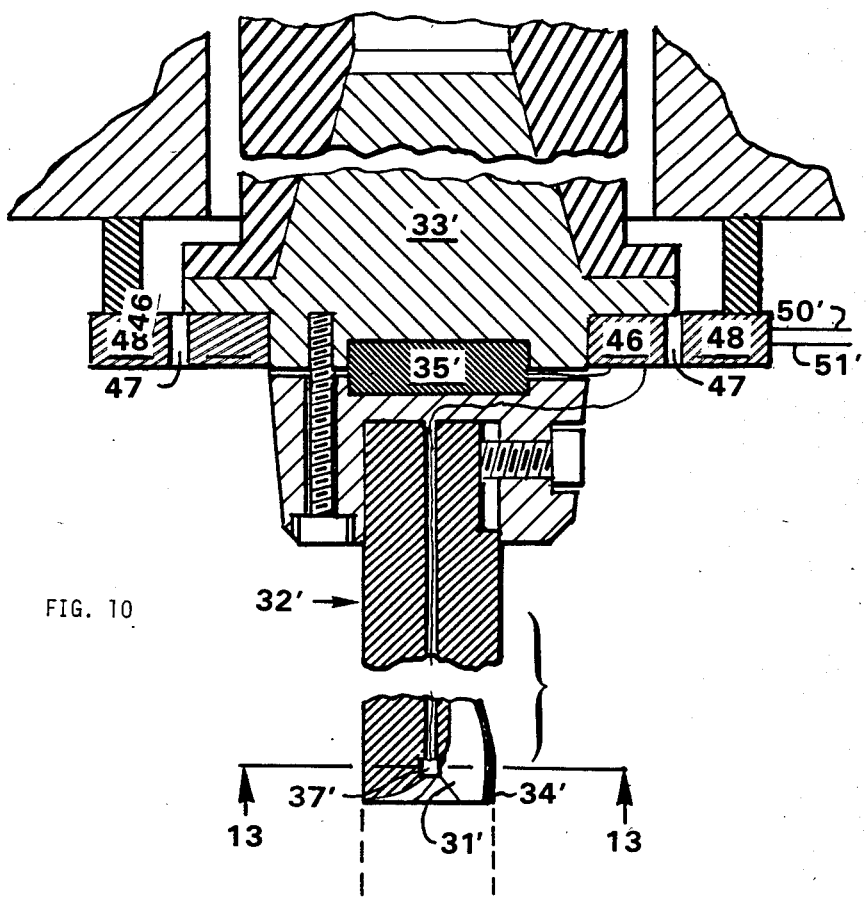
FIG. 10 is a schematic sectional view of typical instrumentation for wear monitoring in milling according to the present invention.

Referring now especially to FIGS. 3a,10,13, and 17, a typical method according to the present invention for monitoring, during machining of a workpiece 30,30', the wear condition of a cutting tool 31,31' having its cutting portion in a structure 32,32' that is held by substantially more massive means 33,33', comprises measuring the component of the dynamic force exerted between the tool 31,31' and the workpiece 30,30' approximately in the direction A,A' normal to the primary cutting edge 34, 34' of the tool 31,31' and to the main cutting velocity V,V' at approximately the fundamental natural frequency of the held structure 32,32' in the same normal direction A,A', measuring the component of vibration in the tool 31,31' approximately in the same normal direction A,A' at approximately the same frequency, computing the value of a wear indicative function of the ratio of the measured force component to the measured vibration component, and providing a selected type of response to the computed value of the function.

Figure 13:
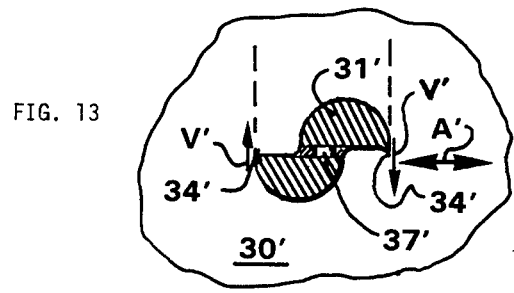
FIG. 13 is a schematic sectional view taken in the plane 13—13 of FIG. 10.
Figure 17:
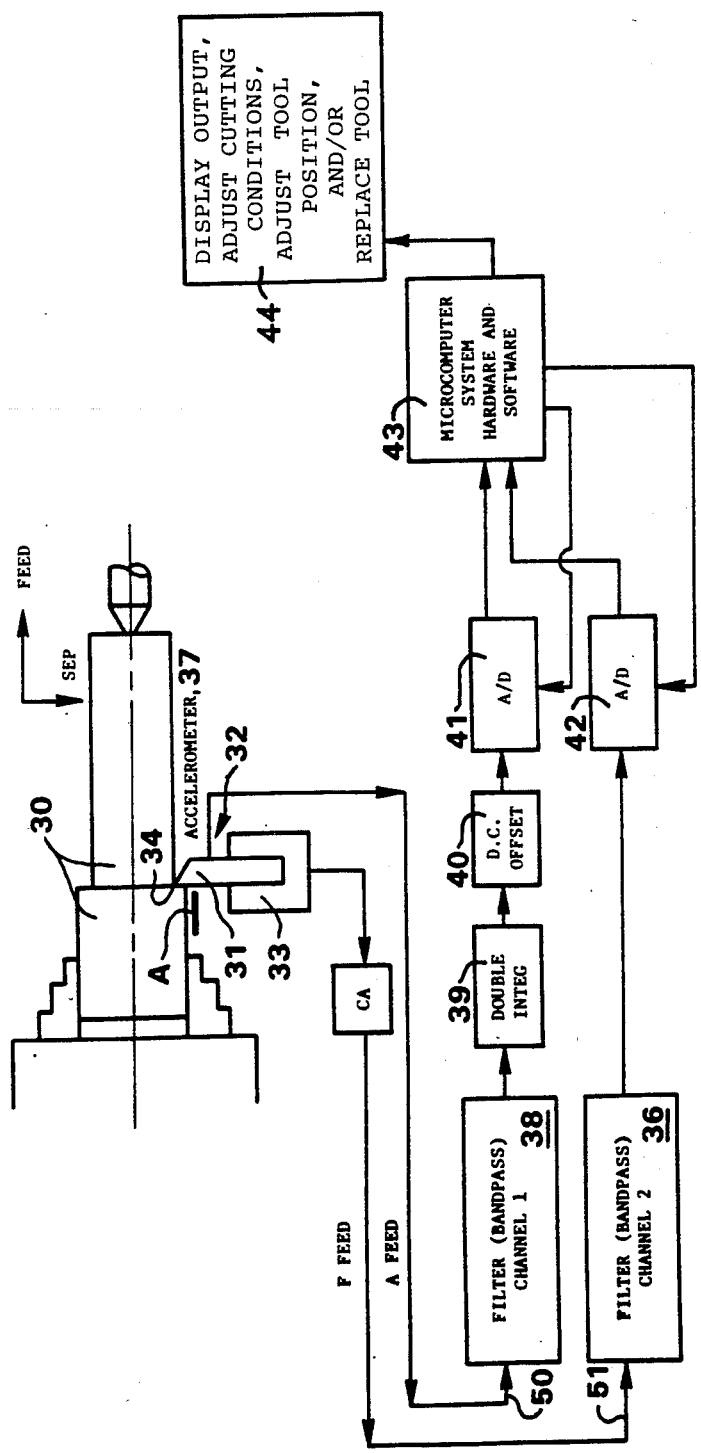
FIG. 17 is a schematic top view and block diagram of typical apparatus according to the invention.

Typically the held structure 32,32' comprises a cantilever structure that extends from the substantially more massive holding means 33,33', and the cutting portion 34,34' of the tool 31,31' is at the outer end of the cantilever 32,32'. As shown in FIGS. 3a and 17, where the machining comprises turning, as on a lathe, the normal component measuring direction A is the direction in which the tool 31 is fed along the workpiece 30. As shown in FIGS. 10 and 13, where the machining comprises milling or drilling with a rotating tool 31', the normal component measuring direction A' is perpendicular to the axis of rotation and to the main cutting edges 34' of the tool 31'. Typically the ratio comprises the root mean square value of the force component divided by the root mean square value of the vibration component during a predetermined time.

The computing step typically comprises computing the amount of wear on the flank of the primary and secondary cutting edges of the tool 31,31' (FW in FIG. 1). The response providing step typically comprises providing a visual display indicative of the computed amount of wear FW, automatically adjusting the cutting conditions such as the feed rate, cutting speed, depth of cut, etc to control the rate of wear FW, automatically adjusting the position of the tool 31,31' relative to the workpiece 30,30' to compensate for the recession (FIG. 2) of the cutting edges 34,34' of the tool 31,31', automatically replacing the tool 31,31' when the wear FW on the flank exceeds a selected limit, or a combination of such responses, as indicated at 44 in FIG. 17.

Typical apparatus according to the present invention for monitoring, during machining of a workpiece 30,30', the wear condition of a cutting tool 31,31' having its cutting portion in a structure 32,32' that is held by substantially more massive means 33,33', comprises means such as a dynamometer or other force transducer means 35,35' and associated bandpass filter means 36 for measuring the component of the dynamic force exerted between the tool 31,31' and the workpiece 30,30' approximately in the direction A,A' normal to the primary cutting edge 34,34' of the tool 31,31' and to the main cutting velocity V,V' at approximately the fundamental natural frequency of the held structure 32,32' in the same normal direction A,A', means such as accelerometer means 37,37', associated bandpass filter means 38, double integrator means 39, and DC offset means 40 for measuring the component of vibration in the tool 31,31' approximately in the same normal direction A,A' at approximately the same frequency, means such as analog to digital converter means 41,42 and data processing means 43 for computing the value of a wear indicative function of the ratio of the measured force component to the measured vibration component, and means such as output response means 44 for providing a selected type of response to the computed value of the function.

Typically the held structure 32,32' comprises a cantilever structure that extends from the substantially more massive holding means 33,33', and the cutting portion 34,34' of the tool 31,31' is at the outer end of the cantilever 32,32'. As shown in FIGS. 3a and 17, where the machining comprises turning, as on a lathe, the normal component measuring direction A is the direction in which the tool 31 is fed along the workpiece 30. As shown in FIGS. 10 and 13, where the machining comprises milling or drilling with a rotating tool 31', the normal component measuring direction A' is perpendicular to the axis of rotation and to the main cutting edges 34' of the tool 31'. Typically the ratio comprises the root mean square value of the force component divided by the root mean square value of the vibration component during a predetermined time.

The computing means typically comprises data processing means 43 for computing the amount of wear on the flank of the primary and secondary cutting edges of the tool 31,31' (FW in FIG. 1). The response providing means 44 typically comprises means for providing a visual display indicative of the computed amount of wear FW, means for automatically adjusting the cutting conditions such as the feed rate, cutting speed, depth of cut, etc to control the rate of wear FW, means for automatically adjusting the position of the tool 31,31' relative to the workpiece 30,30' to compensate for the recession (FIG. 2) of the cutting edges 34,34' of the tool 31,31', means for automatically replacing the tool 31,31' when the wear FW on the flank exceeds a selected limit, or means for providing a combination of such responses, as indicated at 44 in FIG. 17.

As in the case of other machining operations, the application of the WI method to monitor tool condition in milling requires the necessary instrumentation to measure the oscillations in the direction A' normal to the primary cutting edge (perpendicular to the plane of FIG. 13, at 34') and the main cutting velocity vector V and the resistance to these oscillations, in the same direction. The measurement of the oscillations is accomplished by mounting a miniature accelerometer 37' in the body of the milling cutter, as shown in FIG. 13 for a two-fluted end mill, with the direction of measurement of the accelerometer aligned with the normal A' to the primary cutting edge 34', at that location and the main cutting velocity V'. The body of the milling cutter is made hollow to accommodate the cables from the accelerometer.

The measurement of force (resistance to the oscillations) is accomplished by splitting the body of the tool holder and mounting a load cell 35', as shown in FIG. 10, with its measurement sensitive direction aligned with the direction of interest A'. The signals generated by the accelerometer 37' and the force transducer 35' are connected to a rotating signal transmitter 46. The signals from the transducers 35' and 37' are transmitted from the transmitter 46 in the rotating cutter 31', 32',33' across the air gap 47 to the stationary receiver 48, from where they are fed as inputs 50',51' to the appropriate signal conditioners 36,38, etc and the computer 43. The WI and the average flank wear FW on the primary and the secondary edges of tool 31' can then be computed as before.

Instrumentation as in FIGS. 10 and 13 may be used also in drilling.

Experimental study:

The experimental set-up used in the study is schematically illustrated in FIGS. 3a and 3b. Though a variety of forces, vibrations and power measurements were made, only the dynamic force and vibration in the feed direction are pertinent to the developed WI. The set-up consists of a turning tool with a 90° SCEA (Side cutting edge angle) mounted on a 3-component piezo-electric dynamometer with accelerometers mounted on the tool, in various directions, to monitor the force and vibrations during stable turning. The outputs from the dynamometer and the accelerometers were, after the necessary signal conditioning, recorded on tape using a multi-channel FM recorder, for further analysis.

In order to understand the dynamic characteristics of the recorded signals it was necessary to obtain the dynamic properties of the tool-toolholder-dynamometer system. This was carried out, using the impact testing technique, in the three coordinate direction. However from the point of view of the wear index, only the characteristics in the feed-force direction are presented. It is also of consequence that these modes of vibration, in the feed-force direction, are also the weakest modes.

Since the piezo-electric dynamometer is known to closely simulate the tool post it replaces, these dynamic characteristics that were identified are applicable to all turning tool mountings, with minor modifications. The fact that the identified wear index is based on the characteristic of the tool holder, as will be apparent later, and consequently independent of the rest of the system, is also significant.

The three modes in the feed force direction are plotted in FIGS. 4a, b and c. The first mode with the frequency of 1.85 KHz is the translatory mode of the dynamometer (2 KHz affected by the mass of the tool and collar) in the feed force direction. The second mode can be recognized as the torsional mode of the dynamometer with a natural frequency of 3.17 KHz because the node coincides approximately with the center of the dynamometer. The third mode is the vibration of the overhang portion of the tool holder, as can be seen by the mode shape, with the node occurring at its first point of clamping to the collar and the dynamometer.

This mode is the weakest mode (due to the lowest damping ratio of 2.52% is probable combination with lowest static stiffness) and is entirely due to the overhanging portion of the tool shank, thus making it independent of the machine tool and workpiece. It is also sensitive to the length of overhang during clamping, depending on which it exhibited natural frequencies in the range of 4.6 KHz to 5.3 KHz (variation of $\pm 7\%$). This variation would be considerably lower on NC machines where tools are set to lengths of the order of a $\pm 0.0002$ or better.

As extremely stiff mode in the vertical force direction at 6 KHz followed by another mode in the separation force direction at 9.5 KHz made up the rest of the significant dynamic characteristics in the measurement range.

The significance of understanding these modes is to enable the identification of a singular vibratory process, that occurs during "stable" turning, whose output or input parameters might be altered only by tool nose or flank wear and remain unaffected by speed, feed, depth of cut or tool cutting angles. Only then could this, or these, inputs and outputs be considered as unique indicators of tool flank and/or nose wear.

FIG. 5 shows typical spectral decompositions of the force and acceleration signals in the feed direction. The consideration of the dynamometer data at frequencies in excess of its own natural frequency is erroneous only from the point of view of the application of static calibration data to obtain absolute values of force, at the higher frequencies. From the point of view of utilizing the dynamometer outputs for comparative purposes only at identical frequencies, no problem exists.

A study of the spectrums of the force and vibration in the feed force direction with increasing time of cut (increasing flank and nose wear) indicates the following.

(1) Even under "stable" cutting minute oscillations occur all the time. There are very many reasons for these oscillations. Varying material properties, friction processes on the rake face and the flank face (stick-slip type energy), and segmenting of chips are some of those reasons. It is not the intent of this work to explain why these oscillations exist and that is not attempted.

(2) The oscillations are generally present around the natural frequencies of the system (these are around 2, 3 and 5 KHz).

(3) When the cutting tool is sharp the lower frequencies tend to dominate. However, in all instances, as the tool wears, the vibratory mode of the shank (around 5 KHz) becomes dominant. This is known to be the weakest mode (FIG. 4) and its increase in relative spectral power is probably due to its low dynamic stiffness.

(4) Chatter (unstable machining) never occurs at these frequencies. This is because amplitudes during chatter are typically of the order of about 0.0002 inch or more and at those amplitudes, severe interference would occur between the tool flank and the modulated surface, at high frequencies (excess of 1 KHz). This inhibits the occurrence of chatter. Amplitudes measured in stable cutting are less than 0.00005 inch and hence can and do exist at the higher frequencies.

(5) It is not possible to categorically state whether the amplitude levels increase or decrease, with increasing tool wear. A tool wear monitor based purely on amplitude is therefore irrelevant. The decrease in amplitudes at lower frequencies, as a measure of increased damping due to tool wear is not consistent and cannot be used as a tool condition monitor. The increase in amplitudes at the frequency of the weakest mode contradicts the concept of increasing damping due to tool wear.

(6) The only consistent feature that occurs in all the sets of data that were obtained is the fact that as the tool wears the force amplitude at the frequency of the weakest mode (first natural frequency of the cantilevered portion of the cutting tool) increases more rapidly than the vibration amplitude at the same frequency. This phenomenon is the basis for the tool wear monitor that is explained in the next section.

The one other fact that becomes apparent from the spectral decomposition (FIG. 5) is the existence of a natural frequency in the electrical/electronic system very close to 5 KHz (reflected by a peak in $F_F$ just before the peak in $A_F$). The existence of this electrical/electronic dynamometer natural frequency was verified by impacting the tool with a hammer blow, recording the electrical output of the dynamometer and obtaining a transfer function. The proximity of this natural frequency to the frequency relevant to the Wear Index that is to be proposed has been an occasional source of problem in establishing the accuracy of the index.

Based on the observation that the only consistent feature that is identifiable from the spectral analysis of the force and vibration signals in the feed direction is, that as the tool wears, the force amplitude at the frequency of the weakest mode increases more rapidly than the vibration amplitude, a weak index is proposed and verified. It is the ratio of force amplitude divided by the vibration amplitude (F/X) at the frequency corresponding to the first natural frequency of the cantilevered portion of tool holder in the feed direction. Some initial results showing the relationship between the wear index and optically measured wear on the nose and the flank are plotted on FIG. 6 at three cutting speeds (400, 500 and 600 ft/min). A linear relationship is evident and a regression fitted to the data resulted in the equation:

$$WI = 5.07 + 0.0631 V_{Bav} - 0.008 V \quad (1)$$

where WI is the wear index, $V_{Bav}$ the average flank wear and V the cutting speed, with a standard deviation of 0.6256 for the first coefficient; 0.00569 for the second and 0.001220 for the third. Since the probability limits of the third coefficient for even a 90% confidence level would include the value of zero, this coefficient may be neglected, indicating a strong correlation of WI with $V_{Bav}$.

The physical basis of this wear index becomes apparent by studying the interactions between the cutting process and the tool-toolpost-dynamometer system schematically illustrated in FIG. 7.

As the tool cuts, even under stable cutting, the cutting process generates a variety of dynamic disturbances ($F_{cutting}$). These are due to the stick-slip processes occurring between the chip and the tool rake face, chip breaking, inhomogeneity of workpiece material, etc. These disturbances act on the tool-tool post-dynamometer system and create a vibratory motion (X) which is picked up by the accelerometer and delivered as a voltage ($V_{accn}$). Since the cutting tool is in intimate contact with the workpiece at the nose and flank, the vibration of the tool tip is resisted and, depending on the exact characteristics of the interface between the tool tip and the workpiece, a resistance force ($F_{int}$) results. This resisting force superimposed onto the original disturbing force and the inertia force of the vibrating tool is modified by the dynamometer's characteristics and output as a voltage ($V_{force}$).

As the tool wears, and neglecting the inertia effect, the changes between $V_{accn}$ and $V_{force}$ at the first natural frequency of the oscillating tool (around 5 KHz), which are displayed in FIG. 5, can be attributed essentially to the changes in the block representing the tool workpiece interface dynamics (FIG. 7). These interface changes are illustrated in FIG. 8. As the tool oscillates at its first natural frequency, its nose rubs with the finished surface and its flank indents against the surface being cut (FIG. 8a). As the tool develops flank and nose wear there is an increase in both rubbing and indentation areas (FIG. 8b). This results in a greater amount of essentially elastic deformations at these two interfaces, thus increasing the resistance to the oscillations. This increased resistance, which is proportional to the wear on the nose and the flank, translates into an increasing amount of force per unit oscillation amplitude, which is the proposed wear index.

Considering that all the interactions are in the elastic domain, the contact stress developed at the interface can be represented by:

$$\sigma_c = E \cdot (X/R) \quad (2)$$

where
$\sigma_c$ = contact stress
E = Modulus of elasticity of steel
X = amplitude of oscillation and
R = a parameter that allows the displacement X to be transformed into strain.

The force generated at the interface is given by the equation $$P = \sigma_c \cdot A, \text{ i.e.} \quad (3)$$

-continued
$$P = \sigma_c \cdot l_c \cdot V_{Bav}$$

where
P = force
$\sigma_c$ = contact stress
$l_c$ = length of contact between tool and workpiece and
$V_{Bav}$ = average wear land on the tool Substituting Equation 2 into Equation 3 we can write $$P = E \cdot \frac{X}{R} \cdot l_c \cdot V_{Bav} \quad (4)$$

$$\frac{P}{X} = \frac{E \cdot l_c}{R} \cdot V_{Bav}, \text{ i.e.}$$

$$\frac{P}{X} = K \cdot V_{Bav}$$

This is a very simple static justification for the proposed Wear Index. In essence, owing to the dynamic nature of the interaction, the situation is probably more complex than as suggested above. As can be seen from the data the contact length $l_c$ does not play a dominating role in the relationship between the wear land $V_{Bav}$ and the wear index. The simplified concept, however, seems to satisfy the requirements for tool wear monitoring, as can be seen in the following sections.

Considering the physical nature of the WI (Wear Index) it was decided that the following aspects needed evaluation to establish its validity.

(a) Tool material—work material combination. This aspect was of major consideration since the WI is based on frictional interaction between these two elements.

(b) Nose Geometry—Feed Rate Combination. This aspect is of significance since the characteristic of the machined surface is affected by this combination and could have a major effect on a wear index that, to a certain extent, depends on tool-work surface interaction, and (c) Depth of Cut—Work Material Combination. This is of importance since the area of indentation along the flank of the tool is affected not only by flank wear but also the depth of engagement.

A set of base conditions were established. They were:
Work Material—1045 HR
Tool grade—K21 (Kennametal grade)
Nose radius—0.03125 inch
Depth of cut—0.050 inch
Feedrate—0.0099 inch/rev
Cutting speed—600 ft/min.

The planned experiments essentially deviated from these base conditions to account for the three aspects under observation and mentioned above.

This resulted in a set of 47 experiments that were cut down to 40 owing to the unavailability of cutting speeds on the available equipment to properly use coated carbide grades and ceramics. The other variables are summarized in Table 1.

Off—Line, WI Computation Methodology. This is illustrated in FIG. 9, in a block diagram fashion. The AC component of the feedforce ($F_F$) and the acceleration of the tool holder in the feed direction ($A_F$) which are recorded during machining are played back into the two channels of a HP 5423-A Modal Analyzer System. The acceleration signal is double integrated to displacement and both the signals are Fourier analyzed to convert the signals from time domain to frequency domain. The ratio of the force/displacement at the frequency corresponding to the first natural frequency of the cantilevered portion of the tool holder, in the feed direction, is then printed out on a printer. Table 1A shows a typical output of the pertinent variables, as a function of cutting time, for which the tool wear has already been measured during the machining experiments. This computed WI is then processed for correlation to tool wear as presented in the following sections.

TABLE 1
CUTTING CONDITIONS

| | |
|---|---|
| Work materials | 1020 HR, 1045 HR, 4340 HR |
| Tool grades | K 45, K 21, K 420 |
| Nose radius | 0.015625 inch, 0.03125 inch, 0.0625 inch |
| Depth of cut | 0.025 inch, 0.050 inch, 0.100 inch |
| Feed rate | 0.005 inch/rev, 0.010 inch/rev, 0.020 inch/rev |
| Cutting speed | 300 ft/min, 400 ft/min, 500 ft/min, 600 ft/min, 700 ft/min |

TABLE 1A
TYPICAL OUTPUT OF WI COMPUTATION
ID# 0803M2C5500F9.9D50 T5

| TIME | FORCE | DISPL | F/X |
|---|---|---|---|
| At 5325 HZ | | | |
| 0.0 | 2.7E-3 | .44E-6 | 6.1E3 |
| 0.5 | 2.6E-3 | .44E-6 | 5.9E3 |
| 1.0 | 2.6E-3 | .39E-6 | 6.5E3 |
| 1.5 | 2.4E-3 | .37E-6 | 6.5E3 |
| 2.0 | 1.9E-3 | .28E-6 | 6.6E3 |
| 2.5 | 2.8E-3 | .38E-6 | 7.3E3 |
| 3.0 | 2.9E-3 | .38E-6 | 7.5E3 |
| 3.5 | 2.8E-3 | .40E-6 | 7.1E3 |
| 4.0 | 3.0E-3 | .45E-6 | 6.7E3 |
| 4.5 | 3.0E-3 | .42E-6 | 7.3E3 |
| 5.0 | 3.4E-3 | .44E-6 | 7.8E3 |
| 5.5 | 5.1E-3 | .60E-6 | 8.5E3 |
| AT 5350 HZ (CENTER FREQ) | | | |
| 0.0 | 2.4E-3 | .42E-6 | 5.6E3 |
| 0.5 | 2.5E-3 | .38E-6 | 6.4E3 |
| 1.0 | 2.5E-3 | .38E-6 | 6.4E3 |
| 1.5 | 2.1E-3 | .35E-6 | 6.2E3 |
| 2.0 | 2.2E-3 | .32E-6 | 6.8E3 |
| 2.5 | 2.5E-3 | .38E-6 | 6.5E3 |
| 3.0 | 2.5E-3 | .38E-6 | 6.5E3 |
| 3.5 | 2.7E-3 | .40E-6 | 6.8E3 |
| 4.0 | 2.8E-3 | .45E-6 | 6.2E3 |
| 4.5 | 3.0E-3 | .43E-6 | 7.1E3 |
| 5.0 | 3.9E-3 | .50E-6 | 7.7E3 |
| 5.5 | 5.8E-3 | .69E-6 | 8.5E3 |
| AT 5375 HZ | | | |
| 0.0 | 2.3E-3 | .41E-6 | 5.6E3 |
| 0.5 | 2.3E-3 | .39E-6 | 6.0E3 |
| 1.0 | 2.0E-3 | .33E-6 | 5.9E3 |
| 1.5 | 1.6E-3 | .28E-6 | 5.9E3 |
| 2.0 | 2.3E-3 | .36E-6 | 6.4E3 |
| 2.5 | 2.1E-3 | .36E-6 | 5.9E3 |
| 3.0 | 2.4E-3 | .40E-6 | 6.0E3 |
| 3.5 | 2.6E-3 | .38E-6 | 6.7E3 |
| 4.0 | 3.0E-3 | .50E-6 | 6.1E3 |
| 4.5 | 3.3E-3 | .48E-6 | 6.8E3 |
| 5.0 | 4.0E-3 | .53E-6 | 7.6E3 |
| 5.5 | 5.2E-3 | .64E-6 | 8.2E3 |

Using the experimental techniques and methodologies and under cutting conditions described in the preceeding sections, WI values for various values of flank and nose wear of cutting tools were obtained. The results of these investigations are now presented to establish the validity of the identified WI. The average wear that was considered in this study is, as before, governed by this relationship:

$$V_{Bav} = [V_{Bav}(\text{flank}) + V_{Bav}(\text{nose})]/2 \qquad (5)$$

As illustrated in FIG. 11, $V_{Bav}$ is representative of the overall tool condition during rough turning when the depth of cut is larger than the radius of the nose of the cutting edge (FIG. 11a). In finish turning, when the depth of cut is only a fraction of the nose radius, the relationship is:

$$V_{Bav} = V_{Bav}(\text{nose}) \qquad (6)$$

since all the wear occurs on the tool nose. This allows the use of the WI to be used to exclusively compute $V_{Bav}$ (nose) in finish turning and, if the conditions represented in FIG. 2 are valid, the computation of the recession of the edge through the relationship $$ER = V_{Bav}(\text{nose})/(\cot\gamma - \tan\alpha) \qquad (7)$$

where
ER = edge recession
$\alpha$ = rake angle and
$\gamma$ = clearance angle

FIGS. 12(a) and (b) show the relationship between the computed WI and $V_{Bav}$ for 1045 HR and 4340 HR materials under a variety of cutting speeds. The independence of the WI from Work material-tool material-cutting speed combination is evident from the presented results and a linear relationship between the WI and $V_{Bav}$ is also evident.

The effect of work material hardness on the WI does pose certain problems if the concept has to be applied to a great many materials (machining of materials such as aluminum, etc.). However, this can be overcome by considering the initial value of the wear index and then monitoring only the increase as the tool wears. As will be evident later, the provision to do this was incorporated into the software to monitor tool wear but was not found necessary to implement for the materials that were being considered in this work.

FIG. 14 shows the relationship of the WI to $V_{Bav}$ when machining 1045 HR and 4340 HR steel under various tool nose radius-feed rate combinations. Since the depth of cut in all these experiments was only 0.050 inch, machining with a tool nose radius of 1/16 inch (0.0625) would constitute a turning operation as depicted in FIG. 11(b) and only $V_{Bav}$ (nose) is considered. A linear relationship between the WI and $V_{Bav}$ is still evident.

FIG. 15 shows the results. Larger depths of cut do tend to give larger values of WI since the area of indentation on the flank is proportional to the length of cut $l_c$ (Equation 3) which is proportional to the depth of cut. Under the conditions considered in this study the change in WI due to the change in depth of cut seemed to fall within the scatter of the results. This may be due to the fact that though the indentation area on the flank of the tool is proportional to the depth of cut, within the range considered (0.025 inch to 0.100 inch) the contribution of the indentation process on the flank to the WI (i.e. excluding the nose) is not dominant enough to allow the variation in the depth of cut to influence the results beyond what has been recorded and considered to fall within the scatter of the results.

Finally, FIG. 16 shows the results of 3 tests conducted on 1045 material under identical cutting conditions with one test being carried out until tool wear was fairly large ($V_{Bav}$ of 0.016 inch with about 0.022 inch on flank and 0.010 inch on the nose). The repeatability of the WI relationship to the wear on the tool and the extension of the relationship to large wear amounts is clearly established by this study.

Regression analysis of the WI data further confirmed the strong dependence of the WI on the wear of the cutting tool and its independence from other cutting process variables such as speed, feed, depth of cut, tool material and workpiece material. The results of the analysis are summarized in Table 2. Inclusion of all the other variables singly, two at a time and even three at a time does not result in any improvement in the quality of the fit as obtained when regressing wear with the wear index (S. No. 1 in Table 2).

ance of less than 0.0008 inch in turning. This is considered significant.

The strategy for Real-Time Tool condition monitoring entails the measurement of force and vibration amplitudes, in the feed direction and at the frequency corresponding to the first natural frequency of the tool holder. The wear index and the average wear could then be computed from the measured data. Several alternatives to the type of system, capable of doing the above, were considered. They were:

Software System. Here the microcomputer system would be required to sample the data and use a digital (software) filtering technique to isolate the signal at the first natural frequency of the tool holder in the feed

TABLE 2
SUMMARY OF REGRESSION ANALYSIS ON WEAR INDEX DATA

| S. No. | Experimental Combination | Model | Coefficients Value | Standard Deviation | Percentage Variance Due to Regression | Standard Deviation About Regression Line | Remarks |
|---|---|---|---|---|---|---|---|
| 1 | All Data: 1045, 4340 materials with all speeds, feeds, depth of cuts and tool materials | $V_{Bav} = K_1 + K_2 \cdot WI$ | $K_1 = -30.5$ $K_2 = 10.7$ | 5.43 | 62.5 | 0.00106 | At 95% Confidence Level: Error on flank wear: ±0.0021 inch Error on edge recession: ±0.00018 inch |
| 2 | As in 1 | $V_{Bav} = K_1 + K_2 \cdot WI + K_3 \cdot v + K_4 \cdot f + K_5 \sqrt{NR} + K_6 \cdot d$ | | | 64.08 | 0.00103 | Same as above |
| 3 | As in 1 | $V_{Bav} = K_1 + K_2 \cdot WI + K_3 \cdot v + K_4 \cdot f + K_5 \sqrt{NR} + K_6 \cdot d + K_7 WI \cdot v + K_8 WI \cdot f + K_9 WI \cdot \sqrt{NR} + K_{10} WI \cdot d + K_{11} \cdot v \cdot f + K_{12} \cdot v \cdot \sqrt{NR} + K_{13} \cdot v \cdot d + K_{14} \cdot f \cdot \sqrt{NR} + K_{15} \cdot f \cdot d$ | | | 64.08 | 0.00103 | Same as above |
| 4 | As in 1 | $V_{Bav} = K_1 + K_2 \cdot WI + K_3 \cdot v + K_4 \cdot f + K_5 \sqrt{NR} + K_6 \cdot d + K_7 WI \cdot v + K_8 \cdot WI \cdot f + K_9 \cdot WI \sqrt{NR} + K_{10} WI \cdot d + K_{11} \cdot v \cdot f + K_{12} \cdot v \sqrt{NR} + K_{13} \cdot v \cdot d + K_{14} \cdot WI \cdot v \cdot f + K_{15} \cdot WI \cdot v \cdot \sqrt{NR} + \ldots$ | | | 64.08 | 0.00103 | Same as above |

WI = Wear Index
v = cutting speed
f = feed rate
NR = Nose Radius
d = depth of cut The standard deviation of the fit is 0.00106 inch, indicating an error of ±0.00212 inch in the prediction of average flank wear from the computed wear index with a 95% confidence level. If the relationship of wear to loss of the cutting edge is as indicated in FIG. 2, this would mean an error in prediction of the edge recession to ±0.00018 with a 95% confidence level. Translated to a machining situation it would result in dimensional control on diameter to better than ±0.0004 or a total tolerance direction. The WI would be computed by obtaining the ratio of the Root Mean Square (RMS) value of the force/vibration amplitude (since an accelerometer was used for the vibration measurement this signal would have to be double integrated to obtain displacement). The amount of average wear could then be computed from a regression model, similar to the one used in the previous section to establish the independence of the WI, and the wear land width and edge recession displayed on the monitor screen.

Composite System. In this sytem programmable hardware filters were to be used. The microcomputer system would, based on the ID# of the tool in operation, set the cut-off frequencies on the programmable hardware filters (A data base correlating tool ID# and frequencies would be retained by the system). With the filters set to the required frequencies the software would sample the signal (with software or hardware double integration for the accelerometer signal) compute the WI, compute the flank wear land and display the results.

At first it was decided to attempt the software approach. It would allow a considerably higher degree of flexibility in terms of being able to alter filter properties to study the characteristics of the system. However, the time required to carry out the filtering was found to be excessively large. With digital filtering and software integration two sets of 750 data points (force and acceleration) needed almost 25 seconds to filter, integrate and process for wear computation. Since 750 data points at a sampling frequency of 20 KHz constituted only 37.5 msec of data, the time of monitoring as a ratio of total processing time was insufficient to obtain reliable results. (This was in contrast to over 400 msec of data that was processed when the HP-5423A system was used).

When the software system was evaluated to be unsuitable it was decided to implement a hardware integrator and a manual-set, hardware filter system. These manual filters had cut-off of the order of only 24 db/oct as opposed to the originally considered programmable filter that had cut-offs of 96 db/oct (the programmable filters originally envisaged would have had better cut-off characteristics by a 10,000 times order of magnitude). The use of unsuitable filters coupled with known drawbacks in the dynamic characteristics of the force dynamometer (natural frequency close to the natural frequency of tool holder; see FIG. 5) was expected to cut sharply into the capabilities of the RTTC monitor system. However, within the remaining time and money constraints it was considered the best venue to follow.

The implemented system consists of hardware and software intended to monitor the force and vibration amplitudes in the feed direction, during turning and estimate the amount of wear on the tool.

Hardware Description. FIG. 17 schematically represents the hardware. Force and acceleration signals in the feed direction are passed through a pair of band pass filters, manually set to the required bandpass frequencies. While the force signal is directly input into one channel of the A/D convertors of the computer system the acceleration signal is input into a hardware double integrator. In order to overcome any DC offsets that may be introduced by the integrator circuitry, the signal from the integrator is input to a low pass filter with a built-in amplifier and an adjustable DC offset. Only the amplifier and DC offset capability of this device was used. The displacement signal output from the integrator with corrected DC offsets is input into the second channel of the A/D convertor.

The microcomputer is a Motorolo MC-68000 based, 16 bit CPU with adequate RAM and ROM. The software for conducting the RTTC system together with FP arithmetic operations are stored in ROM. Starting of program execution, stopping of execution, as well as input and output of program control parameters are all handled through the alpha-numeric keyboard, while all inputs and outputs are displayed on the video screen. The entire setup was mounted into a single cabinet mounted on castors, for mobility, with a flexan shield to protect the video screen from metal chips etc. The system as packaged provided a portable and convenient RTTC monitoring system.

Software Description. The required software for RTTC monitoring is illustrated in FIG. 18 in a flow diagram fashion. At the outset it consists of the ability to set up/modify a tool data base. This information is stored for each tool, referenced by an ID# (data for up to ten tools could be stored in the present system). The data pertaining to each tool with typical values are listed in Table 3. Most of the items are self-explanatory and designed with computer control of the filters (programmable or software) in mind. $K_1$ and $K_2$ are the regression of the equation $$V_{V_{av}} = K_1 + K_2 \cdot WI \qquad (8)$$

The exact values of $K_1$ and $K_2$ depend on the amplification/attenuation settings on the various electronic instruments used and are required to be developed only once in a calibrating mode of the RTTC monitor. This calibration is done by machining for short time intervals, with $K_1 = 0$ and $K_2 = 1$, to obtain the value of the WI as computed by the system. Tool wear measurements, using a toolmakers microscope, are also carried out and actual $K_1$ and $K_2$ values obtained by regression (The values indicated in Table 3 were obtained in this manner). The software is also designed to operate in an interrupted manner in this mode to facilitate calibration.

TABLE 3

| Tool ID# | 1 |
|---|---|
| Center Frequency | 5300 Hz |
| Rake Angle | −5 Deg. |
| Clearance Angle | 5 Deg. |
| Nose Radius | 0.0315 inch |
| Initial Wear | 0 |
| $K_1$ Regression Parameter | −0.004332 |
| $K_2$ Regression Parameter | 0.01686 |
| Number of Samples | 750 |
| Wear Limit | 0.020 inch |
| Starting Average Counter | 0 |
| Monitoring Interval | 25 sec |
| Sampling Frequency | 20,000 Hz |

The starting average counter is intended to implement the initial wear index method if the system is required to handle machining of materials with a wide range of hardnesses. Depending on the integer number entered in the starting average counter and the choice of the initial wear index method in the main program, an initial average WI value will be computed at the start of the cut. This will be done by proceeding with the WI computations (sampling, computation of RMS values, computation of F/X) in rapid succession, for the number of times specified by the starting average counter, and the computation of an average initial $WI_{int}$. Computation of the actual wear is then carried out using the formula:

$$V_{B_{av}} = K_1 + K_2(WI - WI_{int}) \qquad (9)$$

where WI is the instantaneous wear index.

Figure 19A:
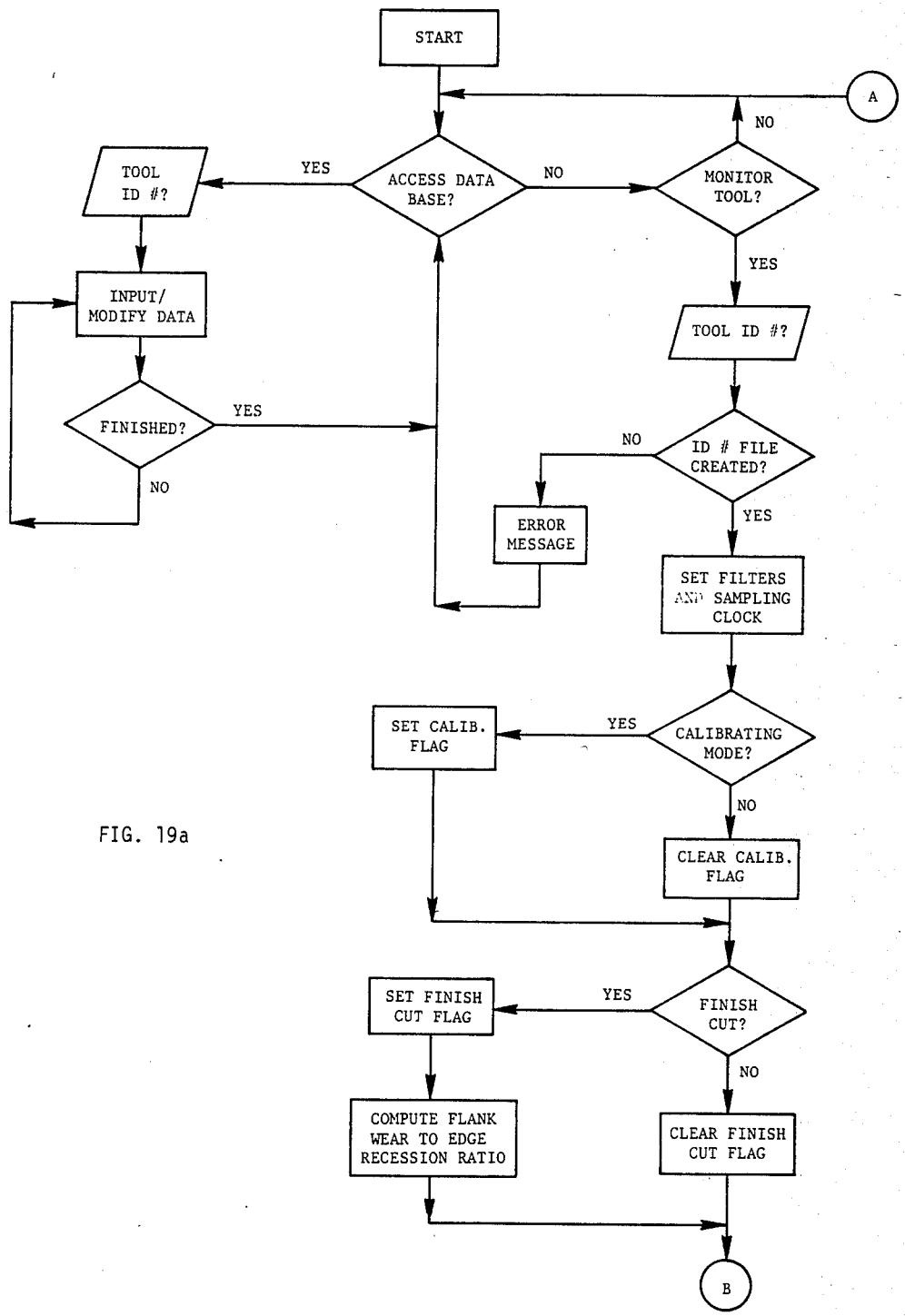
FIG. 19a is a software flowchart for part of a typical tool monitoring system according to the invention.
Figure 19B:
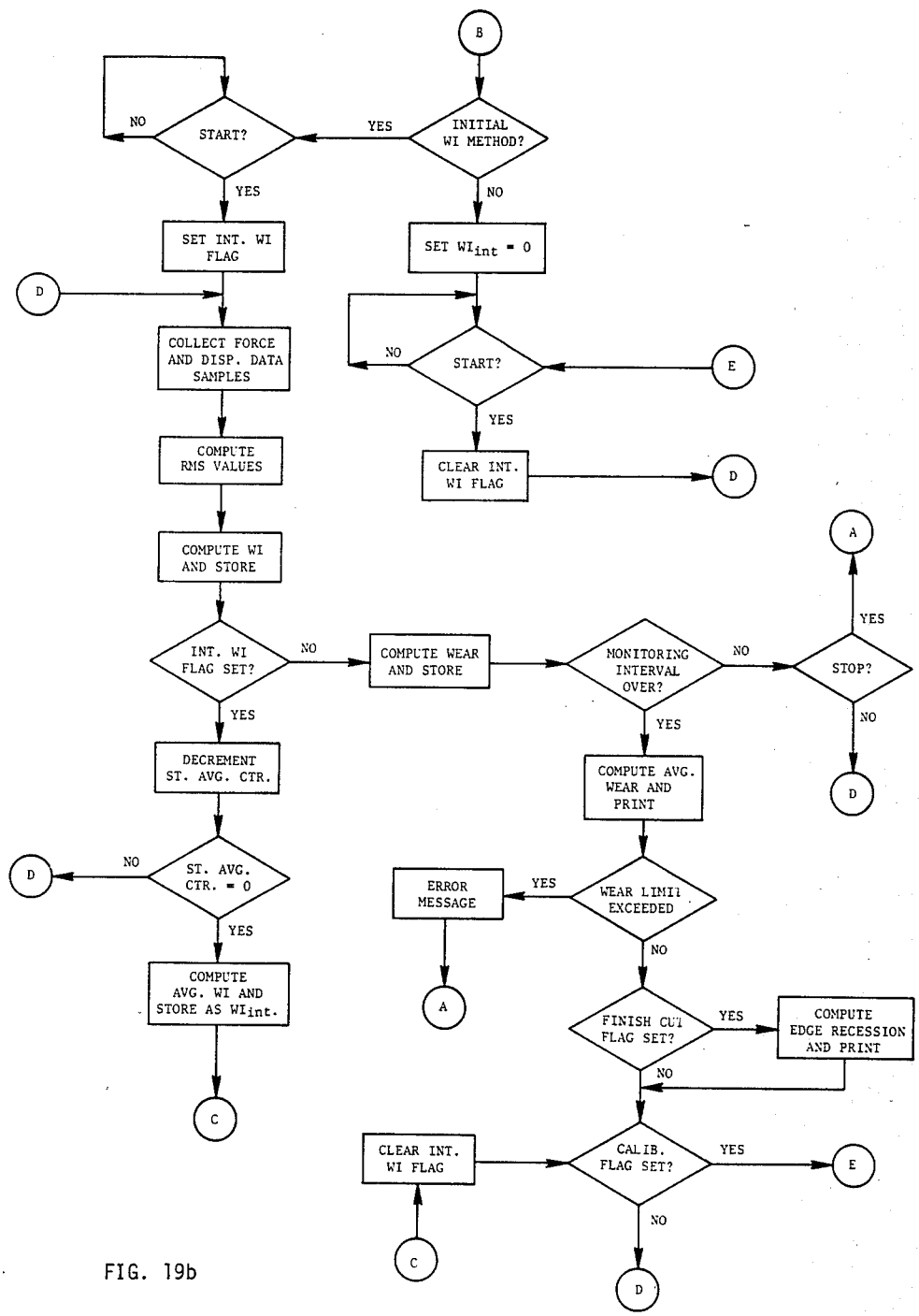
Figure 20:
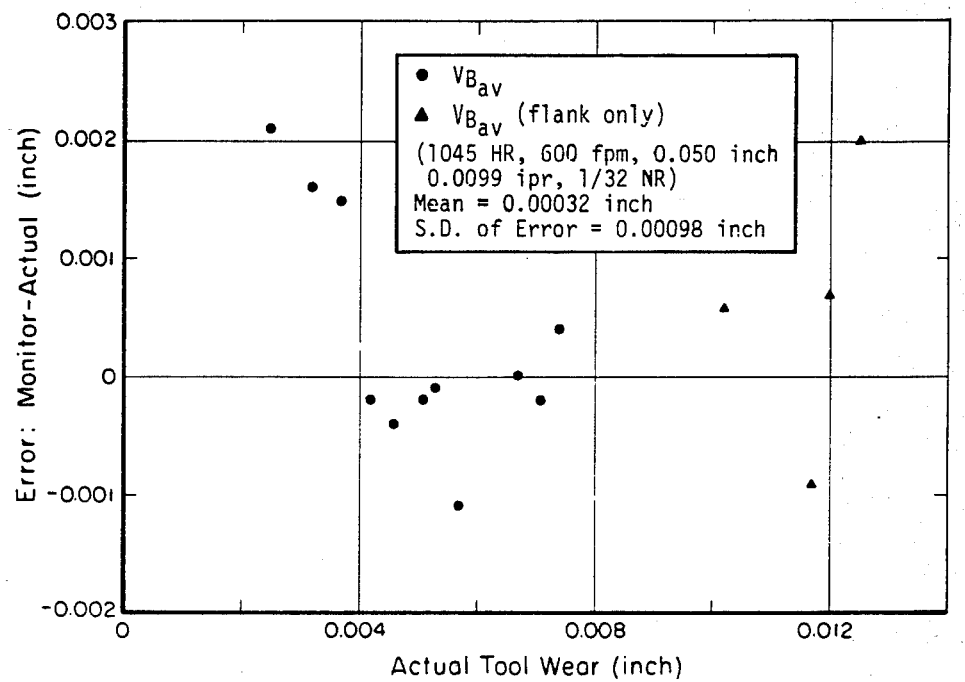
FIGS. 20–25 are plots of monitoring error as a function of tool wear under various machining conditions.
Figure 21:
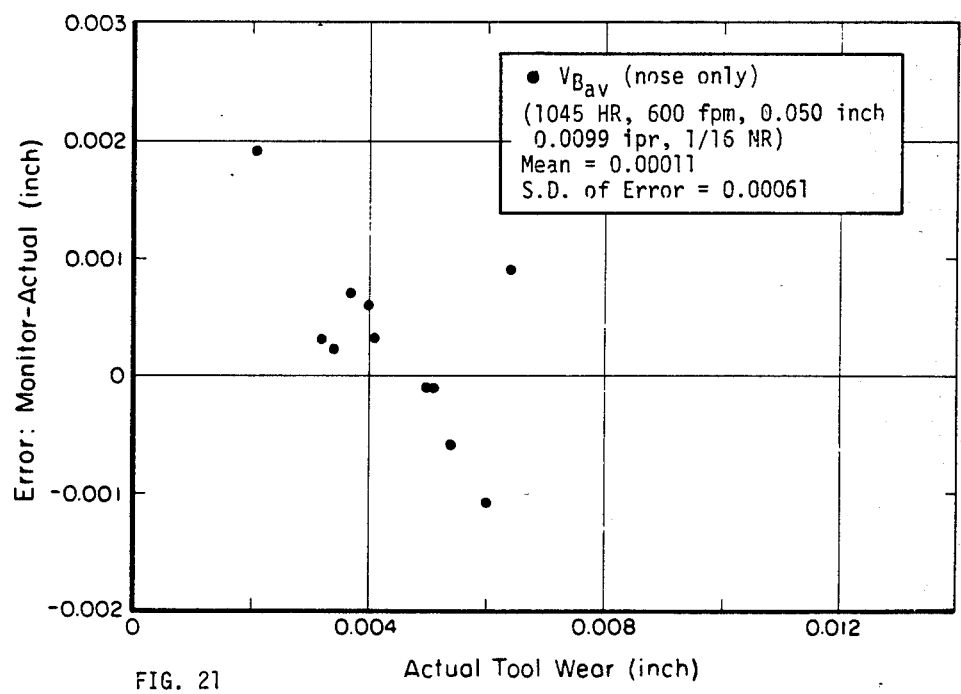
Figure 22:
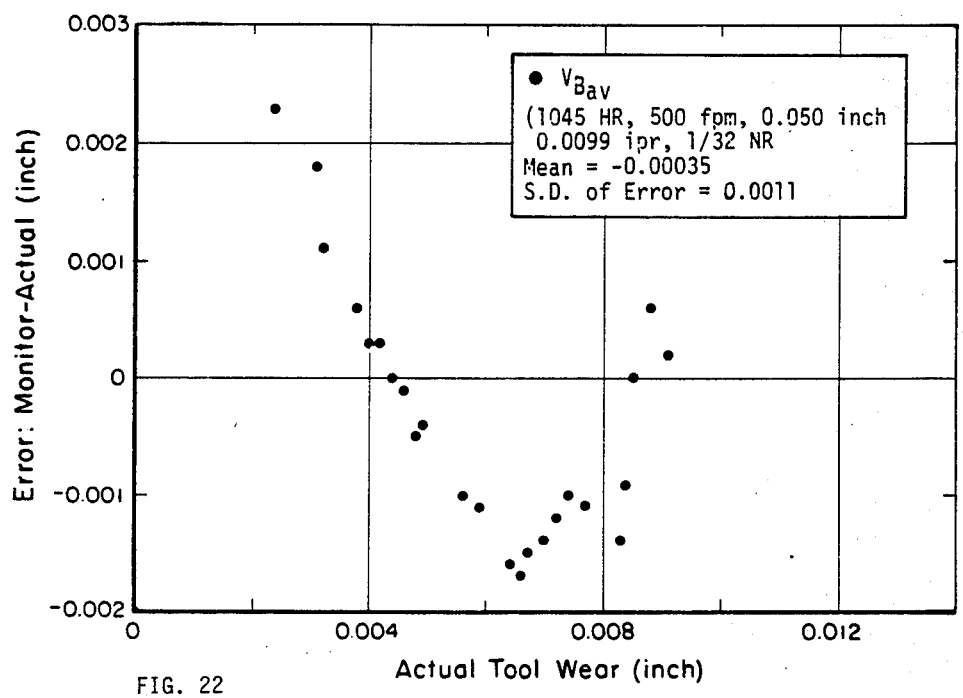
Figure 23:
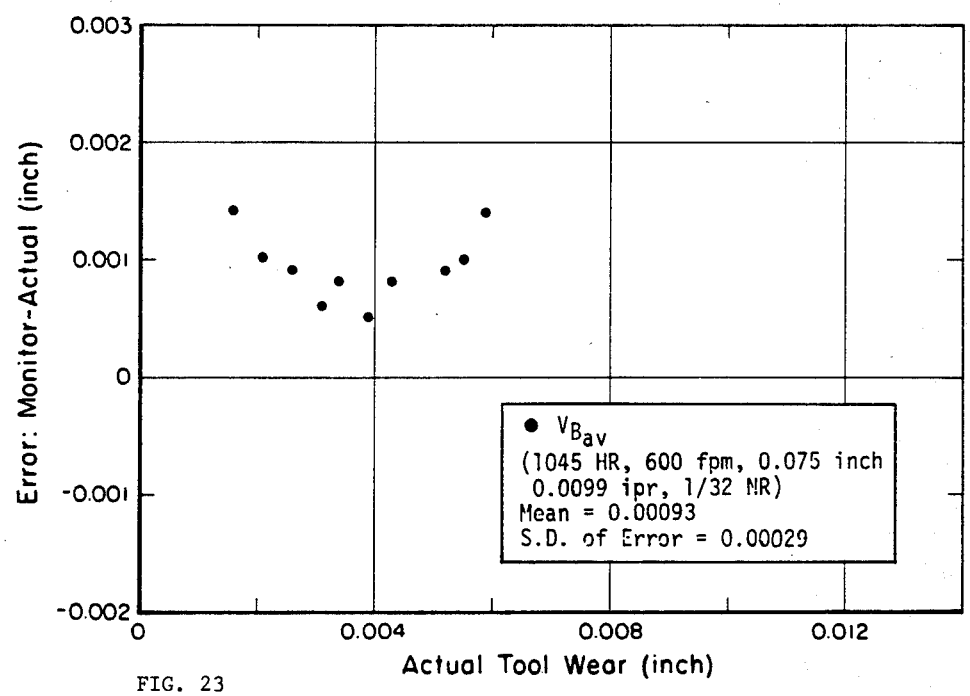
Figure 24:
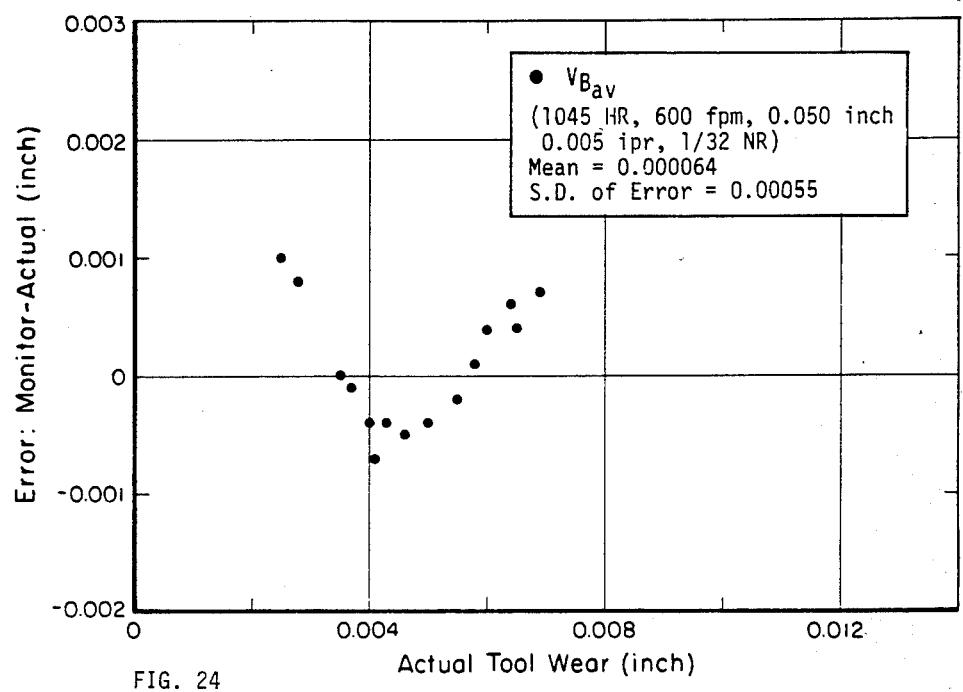
Figure 25:
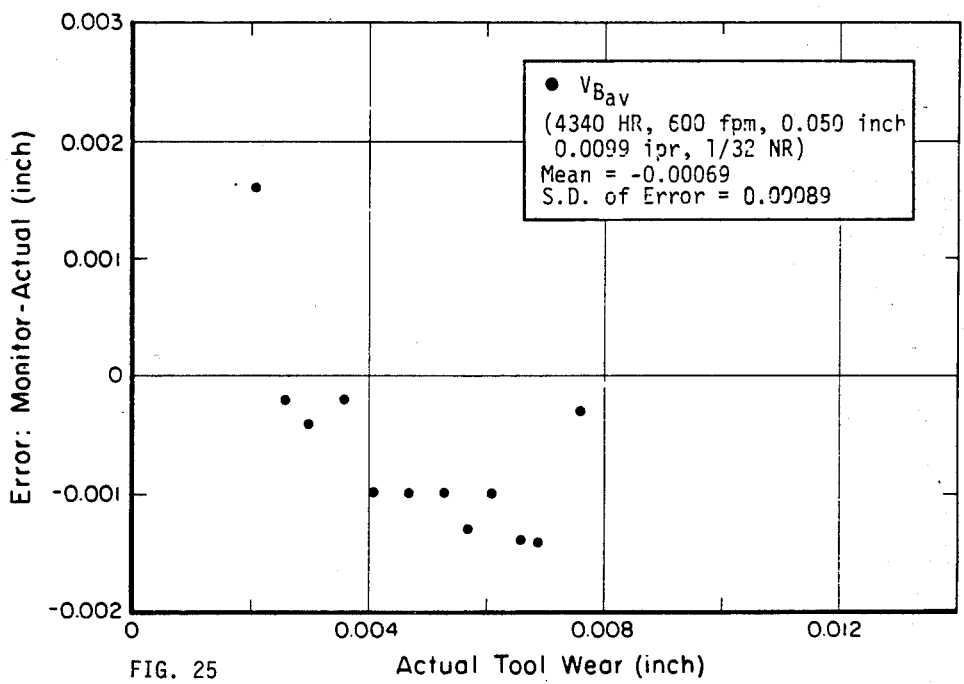

A more detailed sequence of the programmed software is presented in the flow charts on FIGS. 19(a) and (b). The software starts off with the choice of creating/modifying the tool data base items (illustrated in Table 3) or monitoring a tool, with a check to ensure that the tool requested to be monitored has been described in the data base. Once the tool to be monitored is specified, its parameters (frequency, regression parameters etc.) are retrieved from the data base for setting filter parameters and retaining constants for the necessary tool wear computations (the filters were manually set in this implemented set-up). Further, questions to the type of mode (choice of calibrating or operating), type of cut (finish or rough cut) and method (normal or Initial Wear Index method) are then generated with flags being set as required. If the calibrating mode is selected, the monitoring is conducted for the specified monitoring interval and the monitoring discontinued until the system is re-started. This is to allow tool wear measurements, if they are necessary. If rough cut is specified only an average wear land ($V_{Bav}$) is printed out. If finish cut is specified both $V_{Bav}$ and ER (edge recession) as computed by equation (7) are printed on the display. If the Inital Wear Index method is specified the procedure associated with this approach, described earlier, is executed. To implement the Initial Wear Index method the Starting Average Counter must have an integer value entered at the beginning.

This software, written in PASCAL, was developed on the Motorola EXORMACS system and stored on a floppy disc during the testing phase, following which it was stored on an EPROM that could be plugged on a ROM location of the Motorola 68000 system.

The working of the software was first evaluated using data from FM tape. The entire system was then moved next to the Monarch lathe for evaluating the system under actual turning.

Owing to the use of band pass filters with insufficient cut-off characteristics in the implemented system and the existence of a dynamic mode of the dynamometer at a frequency close to the frequency of interest (first natural frequency of the tool holder), it was anticipated that some problems would exist in the quality of the RTTC monitor. The obvious problem would be the inability of the system to accurately monitortool wear under conditions when overall vibration levels are high (low signal to noise ratio). Consequently the following strategy was implemented in evaluating the quality of the monitor.

(a) Operate in the calibrating mode with $K_1=0$ and $K_2=1$ to obtain WI values (with the signal amplifier/attenuators set at convenient values) and actual values of flank and nose wear. Conduct a simple regression to arrive at values of $K_1$ and $K_2$.

(b) With these specified values of $K_1$ and $K_2$ conduct several tests on 1045 HR and 4340 HR steels.

(c) If the accuracy of the monitor was questionable the signals were also recorded on tape for off-line WI analysis, as conducted previously. This was to establish that the WI concept was still valid but the present implemented system did not possess the necessary characteristics to correctly compute the wear.

It must be pointed out, at this stage, that all experiments were conducted only in the calibrating mode of the system. Though this was necessary in order to remove the insert and optically measure the wear lands for verification of the monitor's performance, it was also necessary in order to maintain the temperature of the accelerometer attached to the tool holder. Cutting times in excess of a minute resulted in temperature increases of the order of 150° F., with consequent loss of accelerometer calibration and erroneous monitor results. A sufficiently thick enough ceramic washer, introduced between the tool holder and the accelerometer, resulted in an increase in mass of the oscillatory system with consequent changes in its frequencies and dynamic characteristics. Since the temperature problem had been identified as a source of error it was decided to carry on without an insulator but with a careful watch on the temperature of the accelerometer.

With these considerations in mind a calibration test was run on 1045 steel at 600 fpm, with a K21 grade carbide tool, a feed rate of 0.010 inch/rev, a nose radius of 0.03125 inch and a depth of cut of 0.050 inch. $K_1$ was entered as 0 and $K_2$ as 1 in order to obtain vlaues of F/X for different values of wear on the tool. A regression of the F/X and $V_{Bav}$ data resulted in the following regression parameters.

$K_1 = -0.004332$
$K_2 = 0.01686$

With these regression parameters it was attempted to verify the accuracy of the RTTC monitor under a variety of cutting conditions.

FIGS. 20 through 25 plot monitoring error (Monitor value-actual value) as a function of actual wear. The plotted relationship is in consonance with expected results. In each individual experiment the errors are generally large when the tool is new. With the exact nature of the cutting edge being undefined at this stage and the stable machining process being inherently noisier at the start, the lack of ability of the filters to filter out other oscillations is responsible for this problem. After about 0.003 inch of average flank wear has formed on the cutting tool the monitor is accurately able to predict the wear. This is true until about 0.007 to 0.008 inch of wear land has developed. The machining process immediately proceeds to become noisier at this stage. Added to that is the fact that at this stage the wear land is no longer evenly distributed and optical measurements of the wear land are inaccurate. In fact during the experiments it was generally felt that the larger values of wear as computed by the monitor were probably more representative of the actual tool condition than the optical measurements.

The Mean Error and its Standard Deviation are also indicated in FIGS. 20 through 25. The maximum error that the RTTC monitor indicated, with a 95% level of confidence, is in FIG. 25 and is equal to 0.0025 inch. The best results were in FIG. 24 where the error was 0.0012 inch. Translated into edge recession, for this particular tool geometry, it represents a worst prediction error of about 0.00022 inch and a best prediction error of 0.0001 inch, with a 95% level of confidence. The best condition occurs when cutting conditions were such that the machining process was relatively stable (cutting speed of 600 fpm and low feed rate of 0.005 ipr). The worst case was when the cutting speed was 500 fpm during which the process is relatively noisy (low signal to noise ratio).

Under several conditions the RTTC monitor was unable to predict the wear on the tool. Under these conditions the signals were recorded on tape and analyzed using the previously used off-line technique. FIG. 26 shows the plot of the computed wear index by the HP-5423A Modal analyzer system from one set of recorded data. Though the numerical values of the WI are different from those recorded in earlier experiments (due to changes in the attenuator/amplifier settings of the various instruments), the strong trend is evident. This clearly establishes that even though the postulated trend exists, the poor quality of the implemented filters are unable to sufficiently isolate the frequency of interest for the microcomputer system to identify the trend and accurately compute tool wear.

APPLICABILITY

This program on Real Time Tool Condition monitoring resulted in the following:

(a) Development of a sensing technique, based on a unique identified wear index, which can be computed from force and vibrations signals generated during the "stable" turning process. This wear index, which is independent of cutting process parameters but strongly correlated to the flank wear on the nose and the cutting edge of the tool and dependent on work material hardness, is amenable to computer-aided Real-Time Tool Condition (RTTC) monitoring. It was identified after a thorough study and evaluation of a variety of cutting process outputs, none of which showed the necessary chacteristics for a reliable tool wear sensor.

(b) Based on the identified wear index a microcomputer based RTTC monitor was implemented. Though the off-line analysis of the wear index indicated an error capability of within ±0.00212 on flank wear land (±0.00018 inch on tool nose recession) the implemented monitor gave an error of ±0.0025 inch on flank land, in the worst case (0.00023 inch on tool nose recession). Under some conditions, where wear index trends clearly existed, the implemented system was unable to identify this trend and accurately compute wear. This was entirely due to the poor quality of the instrumentation implemented within the existing time and money constraints. The feasibility of this system was, however, clearly established.

With the concept proved valid it appears feasible to implement a redesigned prototype system, with three problem areas in mind.

(a) Redesign of the tool holder-dynamometer system to isolate the tool holder's first natural frequency from other natural frequencies of the system.

(b) Implement a better signal filtering system, hardware or software (80 db/oct cut-off or better).

(c) Develop temperature insulation for the accelerometer or implement a temperature compensated accelerometer, if available.

The addressing of these areas should be done in conjunction with the implementation of the system on a computer numerical control (CNC) lathe. The algorithms for the implementation of the wear monitor could be directly incorporated into the control computer of the machine tool or, if sufficient mathematical capability is unavailable on the control computer, implemented on a separate computer but integrated to the control computer. The use of the monitor to identify tool wear, implement tool change/replacement decisions and implement nose wear compensation for improved workpiece dimensional control could all be demonstrated. A further outgrowth of this program would then be the implementation of real-time machining process optimization. The knowledge of the exact condition of the tool represents the missing link in the closed loop control of machining process parameters (cutting speed, feed, etc.) to produce components at minimum cost.

The essential nature of the wear index (signal strengths dependent on vibration levels) also makes it appear very promising in terms of application to milling, because the milling process is inherently more vibratory in nature and likely to generate stronger vibratory signals for the purpose of monitoring.

I claim:

1. A method for monitoring, during machining of a workpiece, the wear condition of a cutting tool having a cutting portion in a structure that is held by substantially more massive means, comprising measuring the component of the dynamic force exerted between the tool and the workpiece approximately in the direction normal to the primary cutting edge of the tool and to the main cutting velocity at approximately the fundamental natural frequency of the held structure in the same normal direction, measuring the component of vibration in the tool approximately in the same normal direction at approximtely the same frequency, computing the value of a predetermined wear indicative function of the ratio of the measured force component to the measured vibration component, and providing a predetermined type of response to the computed value of the function comprising at least one of the following operations, (a) adjusting cutting conditions to control the rate of wear, (b) adjusting the position of the tool relative to the workpiece to compensate for recession in the cutting portion of the tool, (c) replacing the tool when the wear on a cutting portion exceeds a selected limit.

2. A method as in claim 1, wherein the machining comprises turning, as on a lathe, and the normal component measuring direction is the direction in which the tool is fed along the workpiece.

3. A method as in claim 1, wherein the machining comprises milling or drilling with a rotating tool, and the normal component measuring direction is perpendicular to the axis of rotation and to the main cutting edges of the tool.

4. A method as in claim 1, wherein the ratio comprises the root mean square value of the force component divided by the root mean square value of the vibration component during a predetermined time.

5. A method as in claim 1, wherein the tool has primary and secondary cutting edges, each having a flank, and the computing step comprises computing the amount of wear on the flank of the primary and secondary cutting edges of the tool.

6. A method as in claim 5, wherein the response providing step comprises providing a visual display indicative of the computed amount of wear.

7. A method as in claim 5, wherein the response providing step comprises automatically adjusting the cutting conditions to control the rate of wear.

8. A method as in claim 5, wherein the response providing step comprises automatically adjusting the position of the tool relative to the workpiece to compensate for the recession of the cutting edges of the tool.

9. A method as in claim 5, wherein the response providing step comprises automatically replacing the tool when the wear on the flank exceeds a selected limit.

10. Apparatus for monitoring, during machining of a workpiece, the wear condition of a cutting tool having a cutting portion in a structure that is held by substantially more massive means, comprising means for measuring the component of the dynamic force exerted between the tool and the workpiece approximately in the direction normal to the primary cutting edge of the tool and to the main cutting velocity at approximately the fundamental natural frequency of the held structure in the same normal direction, means for measuring the component of vibration in the tool approximtely in the same normal direction at approximately the same frequency, means for computing the value of a predetermined wear indicative function of the ratio of the measured force component to the measured vibration component, and means for providing a predetermined type of response to the computed value of the function comprising means for providing at least one of the following operations,
(a) adjusting cutting conditions to control the rate of wear,
(b) adjusting the position of the tool relative to the workpiece to compensate for recession in the cutting portion of the tool,
(c) replacing the tool when the wear on a cutting portion exceeds a selected limit.

11. Apparatus as in claim 10, wherein the held structure comprises a cantilever structure that extends from the substantially more massive holding means, and the cutting portion of the tool is at the outer end of the cantilever.

12. Apparatus as in claim 10, wherein the machining comprises turning, as on a lathe, and the normal component measuring direction is the direction in which the tool is fed along the workpiece.

13. Apparatus as in claim 10, wherein the machinging comprises milling or drilling with a rotating tool, and the normal component measuring direction is perpendicular to the axis of rotation and to the main cutting edges of the tool.

14. Apparatus as in claim 16, wherein the ratio comprises the root mean square value of the force component divided by the root mean square value of the vibration component during a predetermined time.

15. Apparatus as in claim 10, wherein the tool has primary and secondary cutting edges; each having a flank, and the computing means comprises means for computing the amount of wear on the flank of the primary and secondary cutting edges of the tool.

16. Apparatus as in claim 15, wherein the reponse providing means comprises means for providing a visual display indicative of the computed amount of wear.

17. Apparatus as in claim 15, wherein the response providing means comprises means for automatically adjusting the cutting conditions to control the rate of wear.

18. Apparatus as in claim 15, wherein the response providing means comprises means for automatically adjusting the position of the tool relative to the workpiece to compensate for the recession of the cutting edges of the tool.

19. Apparatus as in claim 15, wherein the response providing means comprises means for automatically replacing the tool when the wear on the flank exceeds a selected limit.

20. Apparatus as in claim 10, wherein the means for measuring the said dynamic force component comprises force transducer means and bandpass filter means.

21. Apparatus as in claim 20, wherein the force transducer means comprises a dynamometer.

22. Apparatus as in claim 10, wherein the means for measuring the said component of vibration comprises accelerometer means, whose output is connected to bandpass filter means, whose output is connected to double integration means, whose output is connected to direct current offset means.

23. Apparatus as in claim 10, wherein the computing means comprises analog to digital converter means and data processing means.

* * * * *